(12) United States Patent
Junkka

(10) Patent No.: US 11,717,744 B2
(45) Date of Patent: Aug. 8, 2023

(54) CONTROLLING A USER INTERFACE

(71) Applicant: KING.COM LIMITED, St. Julians (MT)

(72) Inventor: Ida Andersson Junkka, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 17/333,550

(22) Filed: May 28, 2021

(65) Prior Publication Data
US 2022/0379195 A1   Dec. 1, 2022

(51) Int. Cl.
*A63F 13/2145* (2014.01)
*A63F 13/822* (2014.01)
*A63F 13/25* (2014.01)
*A63F 9/06* (2006.01)
*A63F 13/69* (2014.01)
*A63F 13/55* (2014.01)

(52) U.S. Cl.
CPC ............ *A63F 9/0612* (2013.01); *A63F 13/55* (2014.09); *A63F 13/69* (2014.09); *A63F 13/822* (2014.09); *A63F 2300/638* (2013.01)

(58) Field of Classification Search
CPC .......... A63F 13/45; A63F 13/50; A63F 13/52; A63F 13/80; A63F 13/822
See application file for complete search history.

(56) References Cited

U.S. PATENT DOCUMENTS

2017/0056761 A1 * 3/2017 Willman ................. A63F 13/52

* cited by examiner

*Primary Examiner* — Lawrence S Galka
(74) *Attorney, Agent, or Firm* — Saul Ewing LLP

(57) ABSTRACT

A computer device has a user interface which presents a gameboard to a user and detects user input when a user engages with a user selectable game element of the game board. A processor receives a detected user input and detects a qualifying match game condition. The matched elements are removed and new user selectable game elements are provided to replenish the gameboard. The present disclosure provides an activation mode to selectively activate a segment of the gameboard, the segment comprising a subset of gameboard tiles. On detection of a qualifying match game condition, if any of the tiles supporting the user selectable game elements of the match belong to the activated segment, a booster game element is generated.

27 Claims, 14 Drawing Sheets

| | Grade Progress | Grade | Booster Type |
|---|---|---|---|
| Component 1 | 320/500 | 1 | Fish |
| Component 2 | 210/1000 | 2 | Colour Bomb |
| Component 3 | 565/750 | 1 | Line Blaster |
| ... | | | |

501 — 503 — 505

T2:

| Grade | Max Boosters | Activation Criteria | Segment Size (Tiles) | Segment Duration (Moves) | Availability | Grade Threshold |
|---|---|---|---|---|---|---|
| 1 | $v$ | w red candies | $x$ | $y$ | Every $z$ Levels | 750 |
| 2 | $v$ | $w - 2$ red candies | $x + 3$ | $y + 1$ | Every $z - 1$ Levels | 1000 |
| 3 | $v + 1$ | $w - 3$ red candies | $x + 5$ | $y + 2$ | Every $z - 2$ Levels | 1500 |
| ... | | | | | | |

CONTROLLING A USER INTERFACE

FIELD OF THE INVENTION

The present invention relates to controlling a user interface responsive to user engagement with displayed elements on the interface of a computer device.

BACKGROUND OF THE INVENTION

In the field of computer-implemented games, there are many technical challenges facing the designer of such games when considering how the user interface is to be controlled in the context of computer devices available to play the game.

A particular challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements then disappear. In a switcher game, the player switches place of adjacent game elements on the game board so that one or both of them create a chain of at least three adjacent game elements of the same type. Those matched game elements then disappear. The game board is then repopulated with game objects.

Another existing game-type is a "clicker game." A "clicker game" is a type of casual puzzle game where the player is required to find patterns on a seemingly chaotic board. The player then has to match two or more of the same type of game element on the game board and those matched elements are then removed from the board. The player matches adjacent game elements of the same type by selecting one or more of the game elements in a group of matching elements.

A further existing game-type is a "linker game." In this game, the user aims to remove game elements from the gameboard by linking groups of three or more matching elements. The user can select the elements to link by, for example, dragging their finger over the elements on a touch screen and then releasing their finger to select the linked element. Alternatively, the user may click on the elements they wish to link and then actively select a completion button to trigger their selection.

In games of the above type of game mechanic, certain game elements are provided which have additional properties compared with "normal" game elements which can be switched (clicked/linked) and are then removed. Such game elements are often referred to as booster game elements (or simply 'boosters') because they enhance game play, for example they may be triggered, and when triggered they remove additional game elements from the game board according to different removal policies associated with different booster game elements. Booster elements include for example line blasters, column blasters, bombs, fish etc. Booster elements are generally considered to be useful to a player, and existing games provide different ways of earning or obtaining booster game elements according to help functionalities. There are several existing ways in which a help functionality may be implemented in a game to make booster elements easier to achieve. Firstly, the system may automatically and randomly distribute boosters, e.g. line blasters or fish, within the game board upon completion of one or more activation criteria achieved during a play of a game board. For example, known examples of activation criteria include removing a particular number of game elements of a particular type from the gameboard. Alternatively, the help functionality may become a selectable feature that can be manually activated by the user when the one or more activation criteria are satisfied.

This patent specification describes not only various ideas and functions, but also their creative expression. A portion of the disclosure of this patent document therefore contains material to which a claim for copyright is made and notice is hereby given: Copyright King.com Limited 2019 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

The inventors have noted that existing help features suffer from certain disadvantages. The automatic booster generation feature has been noted as a cause of frustration to players who play strategically, as a long-term strategy may be interrupted if a particular game element were randomly replaced with an unwanted booster. Conversely, when a booster generation feature is presented to a user for selection, some users may not notice that the functionality can be activated. The novel computer device described herein implements an activation component functionality which provides boosters to a player but which retains elements of randomness, is easily noticeable and does not interrupt a player strategy.

According to an aspect of the invention there is provided a computer device configured to provide a game to a user, the computer device having:

a user interface comprising a display and configured to provide on the display a gameboard comprising tiles supporting game objects, wherein at least some of the tiles support game objects which are user selectable game elements of differing characteristics, the user interface configured to detect user input when a user engages with a user selectable game element; and a processor configured to receive a detected user input with one of the user selectable game elements and detect a qualifying match game condition of a plurality of adjacent user selectable game elements having matching characteristics, and configured to remove the plurality of user selectable game elements of the qualifying match game condition when a qualifying match game condition is detected and to generate new user selectable game elements to replenish the gameboard;

wherein the processor is further configured to act in an activation mode to selectively activate a segment of the gameboard, the segment comprising a subset of the tiles, wherein the processor is configured to determine on detection of a qualifying match game condition if any of the tiles supporting the user selectable game elements of the qualifying match condition belong to the activated segment, and, if so to generate a booster game element for any qualifying match condition in which at least one of the user selectable game elements is supported by a tile of the segment.

In some embodiments, the processor may be configured to detect if the number of adjacent user selectable game elements in the qualifying match condition satisfies a threshold for a booster creation condition, and to generate a booster game element when the threshold for the booster creation condition is satisfied, the booster game element being provided on the gameboard.

The processor may be configured to visually indicate the segment to a user.

In some embodiments, the processor may be configured to randomly determine at least one of a size of the segment, shape of the segment and placement of the segment on the gameboard.

Alternatively, at least one of the shape of the segment, size of the segment and placement of the segment on the gameboard may be predefined.

In some embodiments, the processor may be configured to generate a graphical rendering of an activation component to visually indicate activation of the segment in the activation mode. In such an embodiment, the processor may be configured to graphically render the activation component as a character.

In some embodiments, the computer device may be configured to provide a clicker game in which the qualifying match condition comprises two or more matching game elements.

The computer device may be configured to provide a game selected from a switcher and linker in which the qualifying match condition comprises three or more matching game elements.

The booster game element which is generated may be of a type selected from a bomb, line blaster, column blaster, colour bomb and fish.

In some embodiments, the processor may be configured to generate a pre-level screen on the user interface to enable a user to select from the pre-level screen an activation component from a plurality of activation components, each activation component associated with a corresponding activation mode. In such an embodiment, the booster game element which is generated may be of a type based on the activation component, in which case the processor may be configured to generate a booster game element selected from a line blaster, column blaster, colour bomb and fish.

In some embodiments, the processor may be configured to generate a number of booster game elements, wherein the number of booster game elements which are generated is based on the number of game elements in the qualifying match condition supported by tiles of the activated segment. In such an embodiment, the computer device may be configured to access a variable associated with a game level of the game, the variable defining an upper limit on the number of booster game elements generated for each qualifying match condition. Such a variable may be comprised in a data structure stored in memory, the data structure further comprising level rules or level data accessible to the processor for implementing the game on a user device.

The processor may be configured to generate the booster game element on a randomly selected tile of the activated segment.

In some embodiments, the processor may be configured to generate the booster game element on a randomly selected tile of the gameboard.

The processor may be configured to act in the activation mode to activate the segment in response to determination that the user has satisfied certain predefined criteria based on the detected user input.

The processor may be configured to act in the activation mode to activate the segment in response to determination that the user has satisfied certain predefined criteria based on the detected user input wherein the predefined criteria depend on the selected activation component.

The processor may be configured to restrict the availability of the generated booster game element for user play based on a time limit or a limit of user moves.

The segment may comprise one or more array of adjacent tiles.

The segment may comprise a plurality of non-adjacent tiles.

The activation mode may be associated with an activation component, and the number of tiles in the activated segment may be based on activation data associated with the activation component.

The activation mode may be associated with an activation component, and the processor may be configured to generate one or more further booster game elements when a qualifying match condition is detected based on activation data associated with the activation component.

The processor may be configured in the activation mode to activate one or more further segment, each activated segment comprising a further subset of the tiles.

In another aspect of the invention, there is provided a method of providing a game to a user on a computer device, the method comprising:

providing on a display of a user interface of the computer device a gameboard comprising tiles supporting game objects, wherein at least some of the tiles support game objects which are user selectable game elements of differing characteristics, receiving a detected user input when a user engages with one of the user selectable game elements;

responsive to the detected user input, detecting a qualifying match game condition of a plurality of adjacent user selectable game elements having matching characteristics;

removing the plurality of user selectable game elements of the qualifying match game condition when a qualifying match game condition is detected and generating new user selectable game elements to replenish the gameboard;

the method further comprising, in an activation mode, selectively activating a segment of the gameboard, the segment comprising a subset of the tiles, and determining on detection of a qualifying match game condition if any of the tiles supporting the user selectable game elements of the qualifying match condition belong to the activated segment, and, if so generating and providing on the gameboard a booster game element for any qualifying match condition in which at least one of the user selectable game elements is supported by a tile of the segment.

In yet another aspect of the invention, there is provided a non-transitory computer readable media on which are stored computer-readable instructions which, when executed by a processor of a computer device, cause the processor to implement a method providing a game to a user on the computer device, the method comprising:

providing on a display of a user interface of the computer device a gameboard comprising tiles supporting game objects, wherein at least some of the tiles support game objects which are user selectable game elements of differing characteristics, receiving a detected user input when a user engages with one of the user selectable game elements;

responsive to the detected user input, detecting a qualifying match game condition of a plurality of adjacent user selectable game elements having matching characteristics;

removing the plurality of user selectable game elements of the qualifying match game condition when a qualifying match game condition is detected and generating new user selectable game elements to replenish the gameboard;

the method further comprising, in an activation mode, selectively activating a segment of the gameboard, the segment comprising a subset of the tiles, and determining on detection of a qualifying match game condition if any of the tiles supporting the user selectable game elements of the qualifying match condition belong to the activated segment, and, if so generating and providing on the gameboard a booster game element for any qualifying match condition in which at least one of the user selectable game elements is supported by a tile of the segment.

For a better understanding of the present invention and to show how the same may be carried into effect, reference will now be made to the accompanying drawings by way of example.

BRIEF DESCRIPTION OF THE DRAWINGS

FIG. 5 shows data structures for holding activation component related data.

DETAILED DESCRIPTION OF THE INVENTION

Figure 1:
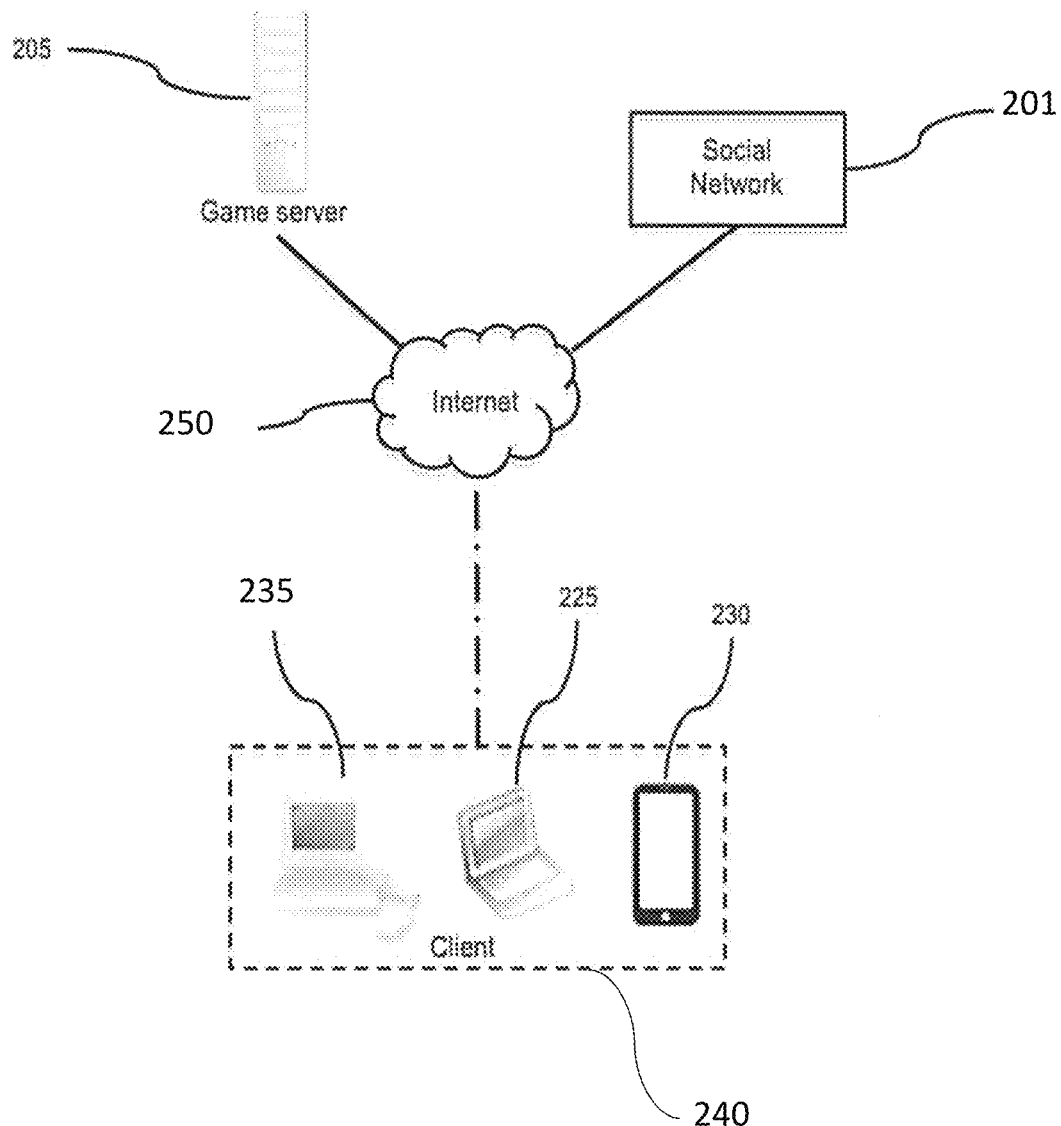
FIG. 1 shows a highly schematic diagram of a computer system architecture.

The terms user and player are used interchangeably throughout this document and no specific meaning is intended using one or the other unless the context suggests otherwise.

The present disclosure relates to a computer device configured to provide an activation mode in a casual game, such as a switcher, to aid a user in obtaining strategically placed booster elements. As already mentioned, there are several existing ways in which a help functionality may be implemented in a game to make booster elements easier to achieve. Firstly, the system may automatically and randomly distribute boosters, e.g. line blasters or fish, within the game board upon completion of one or more activation criteria associated with the help functionality. However, this feature has been noted as a cause of frustration to players who play strategically, as a long-term strategy may be interrupted if a particular game element were randomly replaced with an unwanted booster. Alternatively, the help functionality may become a selectable feature that can be manually activated by the user when the one or more activation criteria are satisfied. However, some users may not notice that the functionality can be activated. The activation component system described herein retains elements of randomness, but is easily noticeable and does not interrupt a player strategy.

In the activation mode, a particular activation component is displayed to a player—for example in the form of a character such as a girl, which may carry particular identifiers recognisable to players. In one embodiment, one activation component is referred to as Power Kimmy. The activation component may be associated with one or more activation criteria. Upon completion on the activation criteria in a level of the game, a segment of the game board may be activated. A segment may comprise one or more tile of the game board. The processor may be configured to activate the segment in response to determination that the user has satisfied certain predefined criteria based on the detected user input, the user input being, for example, a user move in the game. In some embodiments, a particular activation component may be selected from multiple activation components. The predefined activation criteria may depend on the selected activation component. The activation mode may be associated with an activation component, and the number of tiles in the activated segment may be based on activation data associated with the activation component.

The activated segment behaves differently to the remainder of the game board. The gameboard may be graphically modified to display the activated segment to a player. That is, the user interface through which the game is presented to a user may visually indicate the segment to a user. The activated segment may allow a booster element to be generated by a user more easily. In certain existing games, a user may obtain a booster by making a match of greater than three elements. Numbers of matching elements and associated boosters in certain existing games are described later. In existing systems, a 3-element match may only cause the elements to disappear and the gameboard to be refilled, without generating a booster. In contrast, in the present novel activation mode a 3-element match may cause a booster element to be created if at least one of the matched elements is located in a tile within the activated segment.

Figure 2:
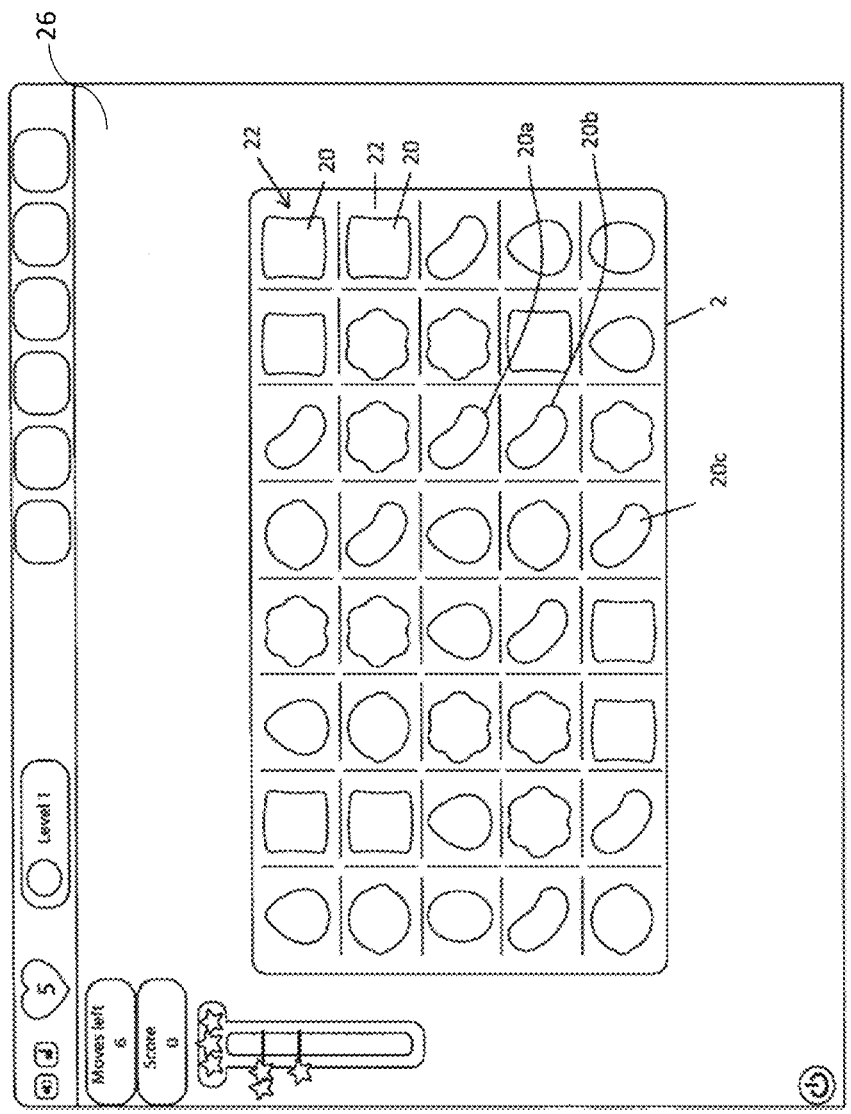
FIG. 2 is a graphical representation of a level in the Candy Crush game.

FIG. 2 shows a display of a known version of a match 3 switcher game called Candy Crush Saga™. FIG. 2 illustrates a game board 2 with a plurality of game elements 20 provided on a user interface 26 of a computer device. The game elements are each of six different shapes and colours. Each game element is supported by a tile 22. In some embodiments, the tiles are not readily visible to a player of the game—the game elements are the main focus for a player. However, the tiles govern characteristics of the game elements which are visible to a player as will be described in more detail later.

Figure 8:
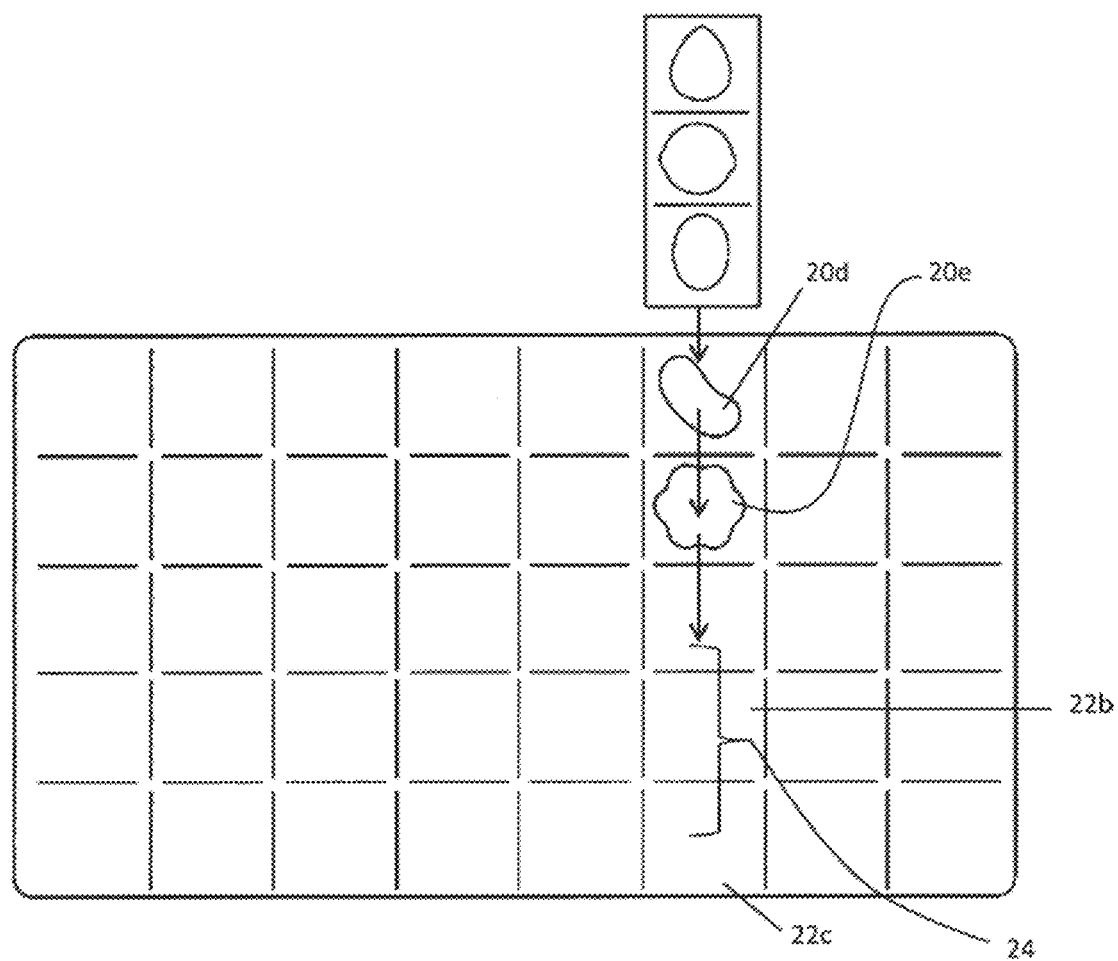
FIG. 8 shows a graphical representation of an exemplary gameboard, demonstrating a refill procedure.

In the known version of the match 3 switcher game discussed above, the aim of the game is to swap game elements in the shape of candies with each other to make moves on the game board. To gain points the player has to make moves that create matches of at least three of the same candy. In doing so, the player gains points and the matched candies are removed. As a result, new candies are generated to fill any vacancies created. New candies may for example appear to fall in place from the top of the gameboard, but other effects are possible. Assume in FIG. 2 that game element 20c is moved one place to the right to form a three-line match with game elements 20a and 20b. Turning now to FIG. 8, this has the effect of game board elements 20a, 20b and 20c "disappearing", creating a visual effect (animation) on the screen to indicate the disappearance, such as a minimal explosion effect denoted 24 in FIG. 8. The two game elements which were directly above game elements 20a will now fall downwards into the spaces created by the removal of game elements 20a, 20b and 20c. Thus, game element 20e will end up at the location of tile 22c, and game element 20d will end up at the location of tile 22b. In addition, three new game elements are generated and fall downwards into the game board to fill the remaining three tiles above tile 22b. In existing games, the newly generated game elements may be generated at random. The user then has a new game board on which to play a subsequent move. Game elements may be of different types, and may include so-called booster game elements which enhance game play for a user. As explained more fully herein, the present disclosure relates to a computer device which is configured so that a user has some agency over when and where booster game elements are generated.

The computer device and its operating modes described herein can be deployed in many different gameplay architectures. For example, a computer device can be configured by a computer game executed on the device. The game may be implemented as a computer program (e.g. game code) that is stored locally in the memory of a PC, games console, tablet or mobile telephone or other computing device. The game can be implemented as a computer program that is stored and runs entirely on one of many processors in a remote server, and data streams or updates are supplied to the client device (e.g. tablet, smartphone, etc.) to enable the client to render and display graphics and sounds.

Another possible infrastructure is a hybrid one, in which back-end servers handle some elements of the gameplay, and for instance a Java game applet is provided to client devices and it is the locally running Java applet that configures the client device to generate the graphics/sounds/user interaction for gameplay on the player's client device. Some data may be fed back to the back-end servers to enable scoring, interaction with other players and cross-platform synchronisation.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

FIG. 1 portrays an exemplary overall environment in which the computer device of the present invention can be utilized as a client device. A virtual game is stored on, for instance, a game server 205. The virtual game is to be played on the client device 240, such as a computer 235, 225 or a smartphone or other handheld device 230. The client device 240 can also be a kiosk, arcade gaming station, smart TV or other device with computing capabilities, input devices, and a screen that can present the game to a user. The client device communicates with the game server 205 and a social network server 201, for instance through the Internet 250 or other network. It should be understood that the social network server 201 and the game server 205 do not have to be located in different places, they could be on the same server or on a plurality of servers located in different locations. People skilled in the art will understand that other devices than the exemplary ones listed can also be used without departing from the scope of the invention.

The computer device may have a user interface allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard while the game is displayed to a user on a separate display of the user interface.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 3:
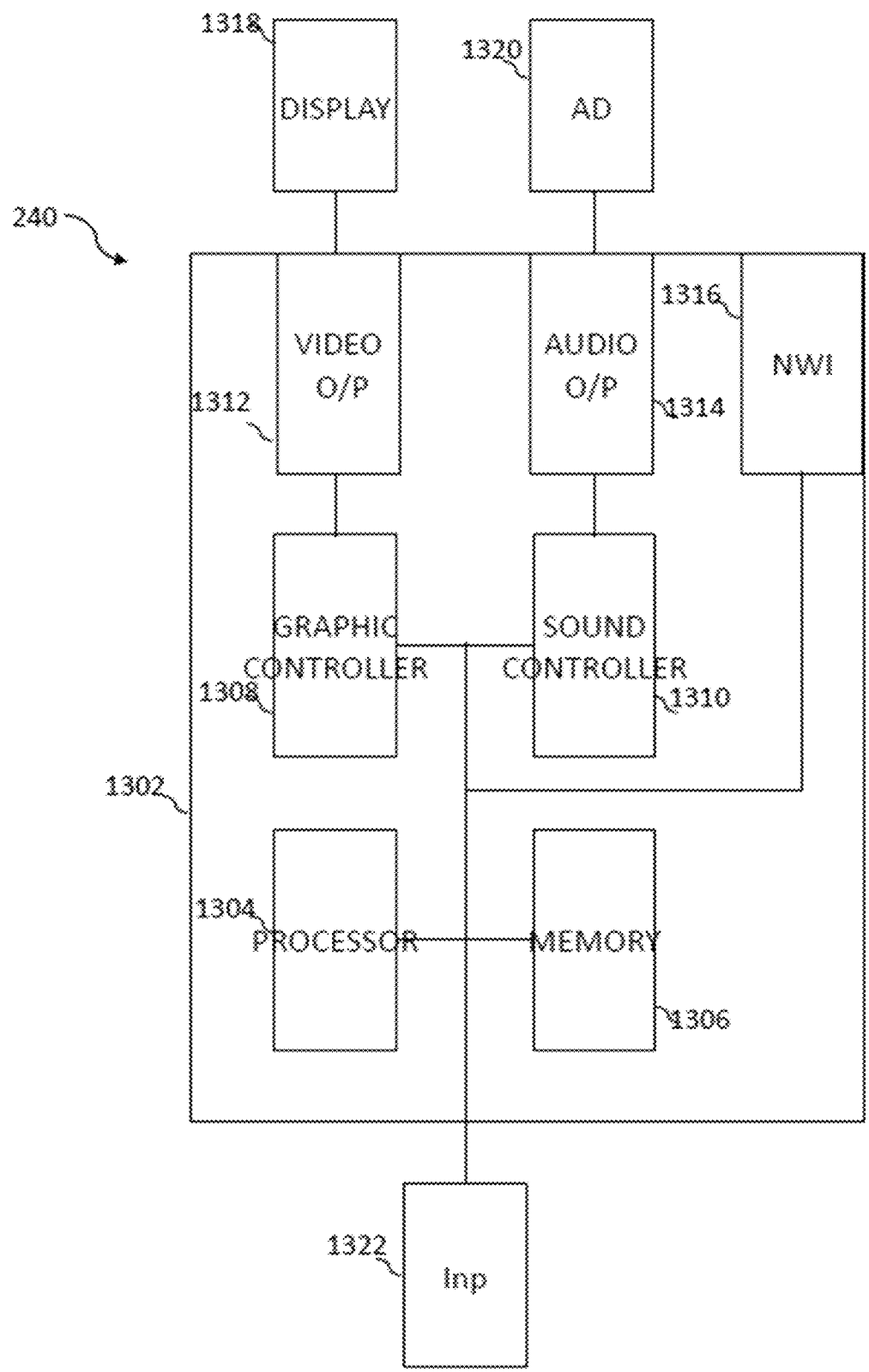
FIG. 3 shows a highly schematic diagram of a computing device.

A schematic view of the user or computing device 240 according to an embodiment is shown in FIG. 3. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional components may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of: a keyboard, mouse, touch screen, joystick or game controller. It should be appreciated that the display 1318 may in some embodiments also provide the input device 1322, for example, by way of an integrated touch screen. The functional components of the controller 1302 are configured to communicate with each other via an interconnect such as a bus or any other suitable interconnect and/or by point to point communication.

It should be appreciated that, in some embodiments, the controller 1320 may be implemented by one or more circuits, at least in part. It should be appreciated that embodiments may be deployed in different system architectures. For example, the computer device may be configured by a computer game that is stored in the memory 1306 of the user device 240. However, when online, the server 205 may handle some elements of the game in some embodiments, as previously described.

In some embodiments, a computer game may be implemented as a computer program that is stored in a memory system, for example the server 205, and which runs on the processor of the game server. Data streams or updates are supplied to the client device 240 to allow the user device 240 to render and display graphics and sounds in a browser of the client device 240.

Figure 10:
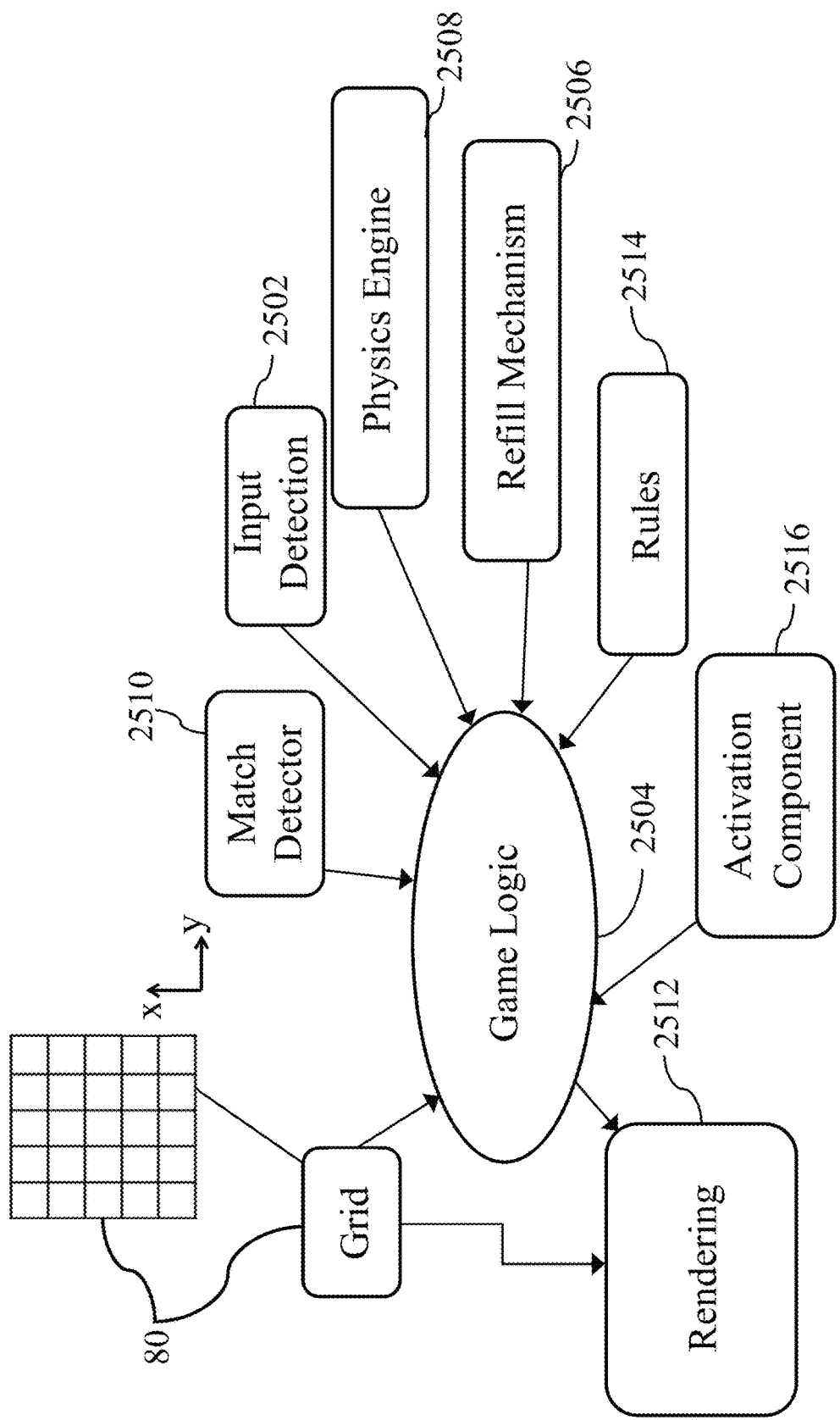
FIG. 10 is a highly schematic diagram of computer related architecture to implement an activation component feature.

FIG. 10 shows a schematic representation of the functional components of an embodiment of a computer device configured to implement an activation mode as described herein. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. Note that the term 'blocks' is used interchangeably herein to denote game elements or game objects. The game logic 2504 processes the information provided by the user input. The game logic 2504 may then determine if a valid selection has been made, and what the outcomes of the selection should be.

The rendering component is used to render the gameboard 2 to the user. It renders the game elements on the gameboard 2. Each time a game element moves tile location, for example, during gameboard refill, the rendering block is used to render this movement visible to the user on the display 1318 of the user device 240.

The grid component 80 stored in a memory provides a grid representation of the game board as shown schematically in FIG. 10. The grid component can be supplied by any suitable data structure, held in a local memory or remote memory accessible by the device, and is responsible for identifying each tile location on the game board and thus providing tile data including a tile ID and associated attributes about the game object displayed at that tile location. These associated attributes may then be used in combination with other components in order to control the rendering of the display, e.g. a match detector component 2510, and a refill mechanism component 2506.

Each game object has object attributes associated therewith. The object attributes may be stored in any suitable memory location. In some embodiments, the object attributes may be provided by a data structure. In some embodiments, the object attributes may be considered to be part of the game logic and in other embodiments may be considered to be outside the game logic. The object attributes may provide information as to the properties of a game object. These properties can include information of type/characteristic such as colour and/or whether or not a game object has a particular function such as a booster function.

The game logic 2504 determines the game objects selected by a user, and the actions to follow to implement the game mechanic. The following describes an implementation using a 'switcher' mechanic where groups of 3 or more matching objects (referred to in this document as blockers or game elements) are created when a user switches two adjacent objects and the resulting matching adjacent objects are automatically removed. It will be appreciated that the features describe herein may apply equally to other types of games, such as "clickers" and "linkers." The device capable of providing the features described herein may be configured to provide a clicker game in which the qualifying match condition comprises two or more matching game elements. Alternatively, the game may be selected from a "switcher" and "linker," in which the qualifying match condition comprises three or more matching game elements.

Thus, the game logic controls the rules for determining if a valid match has been created for removal of the matched game elements from the gameboard. The game logic 2504 operates according to a set of rules of the level the user is playing. Predefined activation criteria may be embodied in these per-level rules, or may be generic to multiple levels. The game logic has access to data for each tile including its tile ID designating its location on the grid 80, and associated tile attributes providing information about the contents of that tile, e.g. the game object within that tile, at least one characteristic associated with the game object within the tile. The game logic 2504 is thus able to determine the game elements to be removed from those respective tiles for each user selection.

The physics engine component 2508 is configured to control the rendering of moving game objects in the display. The physics engine 2508 may be part of the game logic 2504.

Figure 6:
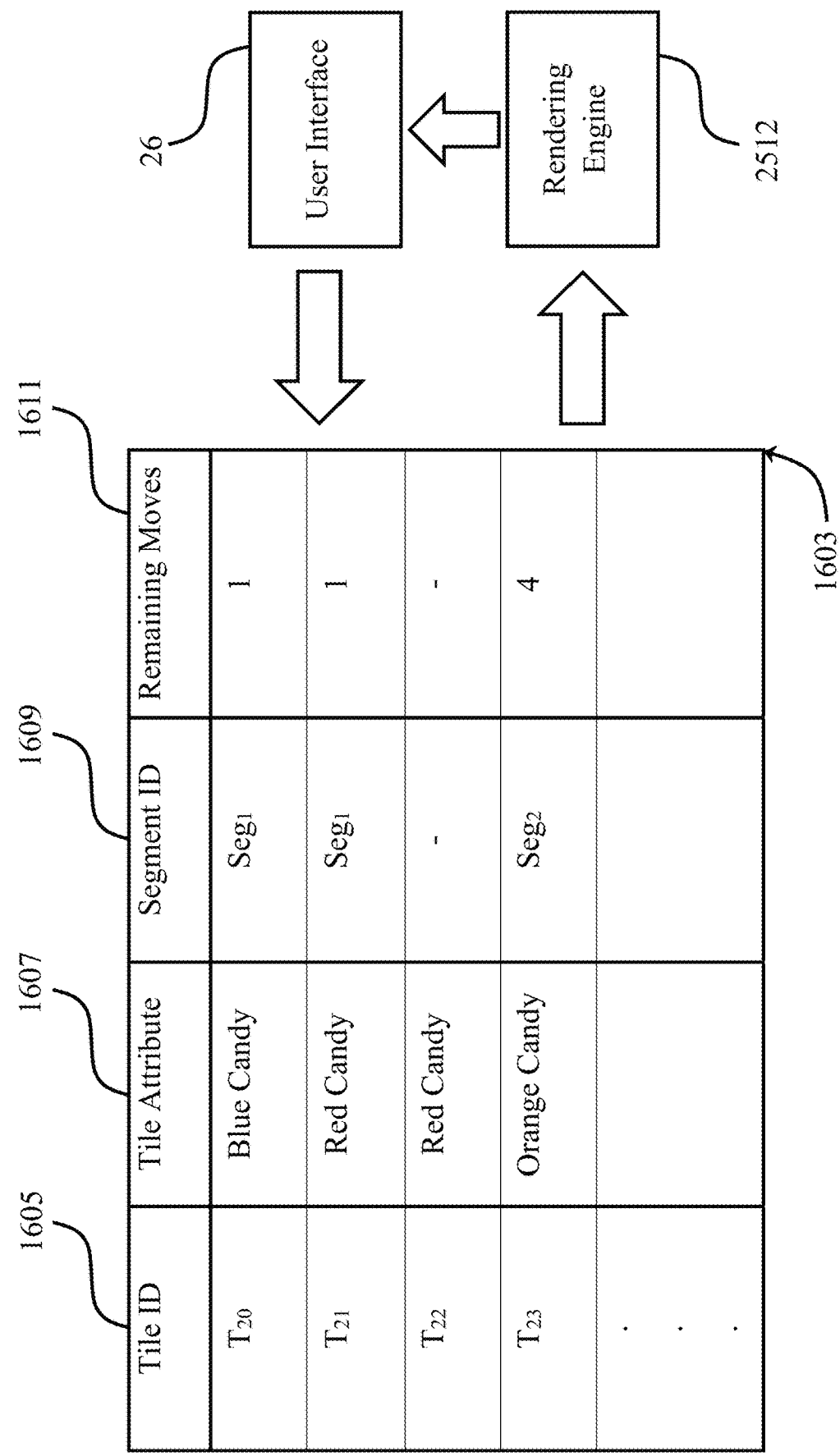
FIG. 6 shows a data structure comprising tile data and segment data for a level.

An activation component module 2516 is configured to implement the activation component functionality, as described herein. For example, the activation component module 2516 may be configured to allow an activation component to be activated upon completion of particular activation criteria. Further, the activation component module 2516 may control the game logic to generate and place boosters according to the rules of activated segments provided by the activation component module 2516. A booster may be provided on the game board prior to refilling the game board or provided after gameboard refill as described further herein. The activation component module 2516 may also include data structures such as those of FIGS. 5 and 6, the data structures comprising data pertaining to activation components and their implementation. FIGS. 5 and 6 are described in more detail later.

Figure 7:
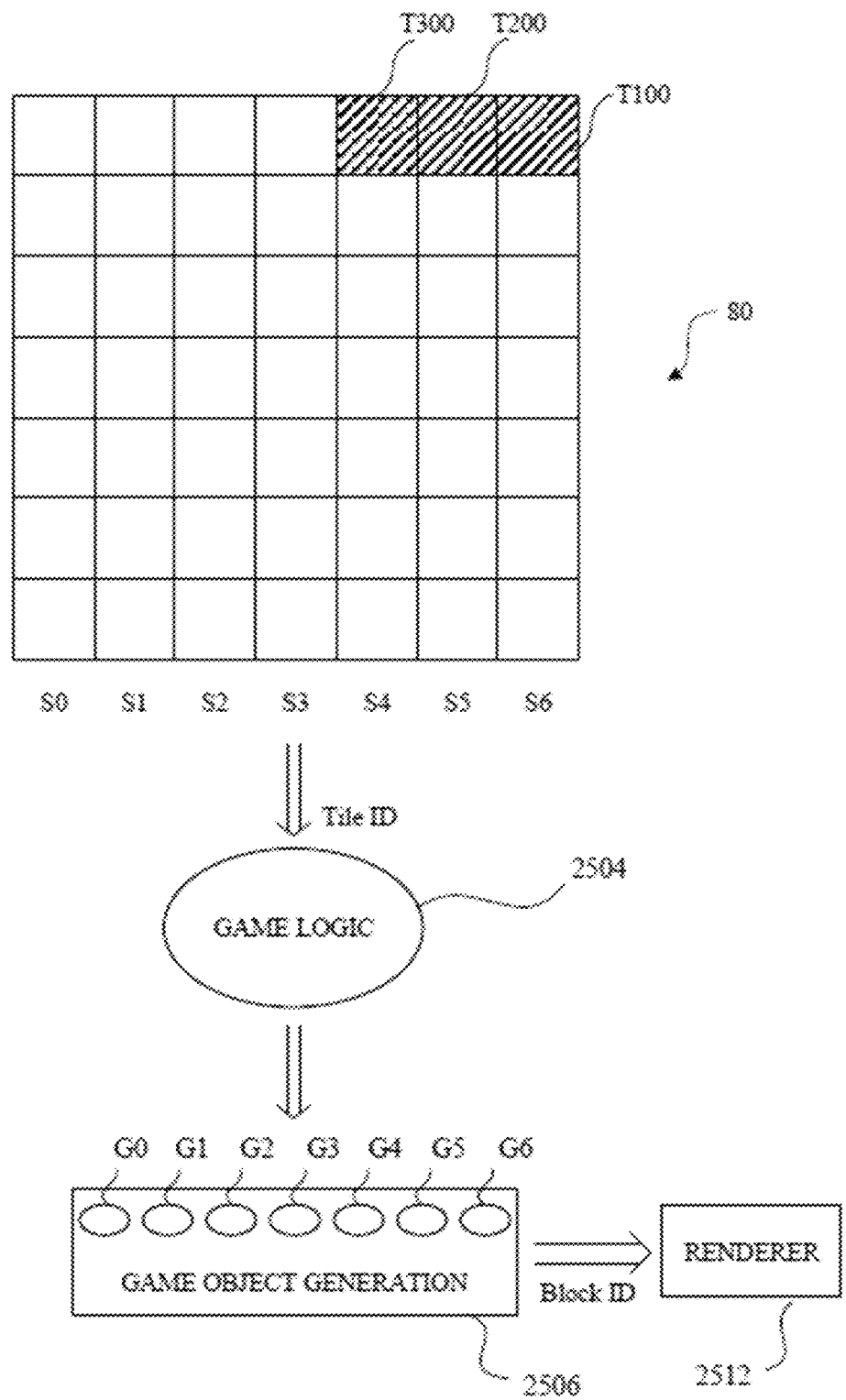
FIG. 7 is a highly schematic diagram that represents a refill mechanism.

FIG. 7 is a highly schematic block diagram illustrating how gameboards are rendered visible to the user through a normal refill process. In the normal refill, the refill process may be set to random. In fact, the random refill process may be pseudorandom. Each game level has an initial gameboard which is a layout of tiles, each tile having one or more tile attribute defined by the tile data in the initial layout. FIG. 7 shows a tile layout in the form of the grid 80. The grid can be considered as a map which may be used to determining the relative positions of tiles on the game board from the tile ID. This tile grid 80 shows an array of tiles arranged in rows and columns. In FIG. 7, the grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns.

As already explained, in order to render a gameboard on a display, each tile is associated with a game object to be rendered at that tile location. The nature of the game object, that is, for example, if it is a blocker or is playable (a normal game element or booster game element), is determined by the tile attribute(s). The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where game objects may need to be spawned to replenish the gameboard. In a normal game refill process, new game objects are spawned in tiles that have an attribute associating them with playable (user interactable) game elements. A new game element is spawned into effect at an entry point of the set. For convenience, the endmost tile (in this case T100) can be considered the entry point for S6. However, any entry point for a set can be defined, and the precise entry point may depend on the orientation or shape of the set. Game objects are spawned into sets at their respective entry points. If the tile below the entry point is vacant, the spawned game object is moved down to that tile and then a further game object is spawned above it at the entry point. Note that sets may be of different configurations and spawned game objects may be moved to vacant tiles according to different refill physics.

Each tile of the grid 80 may be associated with data to indicate a status, such as filled or unfilled (empty/vacant) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular game objects. This may be as the endpoint of a game element which is already in the game board and moving as a result of a game move due to the action of a physics engine 2508, or as the endpoint of a new game object entering the game board.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a game object is to be spawned. That is, the tile identifier indicates the set in which the tile belongs, and enables the entry point of the set to be indicated. This tile identifier enables the appropriate algorithm to be activated, and a game object identifier is generated by that algorithm to a renderer 2512 which controls a display 1318 on which the game board is presented to cause that game object to be inserted at the entry point. Within each set the process may be entirely deterministic. That is, game objects are provided in a predetermined sequence into the set, and moved through the set in a predetermined way. That sequence may be the same for all sets, or each set may have a different sequence. Alternatively, the game objects may be spawned in a random sequence. Randomly spawned game objects will still move through the set in a predetermined way, as dictated by the refill physics.

Each generator G0 to G6 can be controlled with a respective seed which then causes a pseudo-random sequence of game objects to be generated based on that seed.

The gameboard used in gameplay is defined by the tile grid 80. Each tile is rendered at a location and may support a game object. Some tile locations may constitute a 'hole' in the game board at which no gameboard tile is located. As described earlier, each tile has its own unique ID associated with it. Attributes about the game objects occupying each tile of the grid are stored in association with the name, or ID, of the tile. This tile data may be stored in, for example, the tile database 1603 (see FIG. 6). When game elements are removed from the tile grid 80, tile refill occurs, and the game objects located at the tiles affected by the refill process change. The data stored in the tile database is updated to represent the locations of elements on the grid 80 after refill. The position of a game element may be either where the game element is on the grid 80 or where the game element is going (e.g. the endpoint of a game element moving due to a refill).

When a booster is generated in the activation mode, it may be placed on the game board at a particular tile prior to executing the above described refill process. That tile then no longer constitutes an endpoint for the refill process. Alternatively, the described refill process may be carried out, and then a booster replaces a game element that was provided during the refill.

Holes in the grid show a background and are not valid game board areas. That is, there are no tiles at the locations of the holes. Alternatively, there may be tiles at the locations of the holes in the grid 80, but the attribute of these tiles may be holes, and their attribute remains unchanged through game play. Game elements cannot occupy holes in the gameboard, but can fall through them. The shape of the grid may vary.

In a switcher game, whether the colour and/or shape characteristics of adjacent elements match is determined by a match check. This check may be carried out for the whole gameboard where there are game elements. All game elements on the game board are match checked against the game elements immediately adjacent to them. Alternatively, only some game elements on the gameboard are match checked. The game elements to be match checked may be determined by the location of user interaction with the gameboard, and/or the location of recent tile activity such as game element removal or game element refill. When multiple game elements are detected to have matching characteristics, a group of game elements is formed such that even game elements which are not directly adjacent to each other are included in the same group as long as they are connected in an adjacent manner via other game elements which also possess the same matching characteristic. In some embodiments, these groups of matching adjacent game elements may have to all be connected in one direction, i.e. they may have to be either vertically or horizontally connected. The match check is implemented after the player selects the two game elements to switch tile locations.

When a match is determined to exceed a threshold, for example to have more than three matching elements, a booster of a type corresponding to the number of the matched elements is generated and placed on the game board. These may be placed randomly on the gameboard. It is an objective of the present computer device to provide boosters in additional circumstances which do not depend on a match exceeding a threshold number of elements. In existing systems, a booster element may be created when a match of more than three elements of the same type is made, the booster element having a particular functionality associated therewith that makes generation of the booster element worthwhile for users. For example, a match consisting of 4 elements of the same type in a row (or column) may cause a "Striped candy" to be generated and placed on the game board. Striped candies remove a whole row or column if matched with two or more candies of the same type. A striped candy therefore offers a user the opportunity to remove more game elements in on move than they would otherwise be able to, without the booster element. Booster elements and the creation thereof may therefore be considered a strategic goal of users of the switcher game.

There are several existing ways in which a help functionality may be implemented in a switcher game to make booster elements easier to achieve. Firstly, the system may automatically and randomly distribute boosters, e.g. line blasters or fish, within the game board upon completion of one or more activation criteria associated with the help functionality. However, this feature has been noted as a cause of frustration to players who play strategically, as a long-term strategy may be interrupted if a particular game element were randomly replaced with an unwanted booster. Alternatively, the help functionality may become a selectable feature that can be manually activated by the user when the one or more activation criteria are satisfied. However, some users may not notice that the functionality can be activated. The activation mode described herein retains elements of randomness, but is easily noticeable and does not interrupt a strategy.

A particular activation component may be associated with one or more activation criteria. Upon completion on the activation criteria in a level, a segment of the game board may be activated. Upon activation of the segment, the tile database 1603 may be updated such the tiles that form part of the activated segment are identified as being part of the activated segment.

The activated gameboard segment may also be graphically modified to display the activated segment to a player. The system is configured to identify match conditions wherein at least one of the matched elements is located in a tile position within the activated segment. The activated segment may allow a booster element to be generated by a user more easily. For example, a 3-element match which, in existing systems may cause the elements to disappear and the gameboard to be refilled, without a booster being generated, may cause a booster element to be created if at least one of the matched elements is located in a tile within the activated segment. A booster element generated by a qualifying match condition within the activated segment may be placed on a randomly selected tile of the activated segment. Alternatively, the processor may be configured to place the booster element on a randomly selected tile of the gameboard, which may or may not be in the segment. Alternatively the booster element may be placed on one of the tiles of the match condition. Where only one tile of the match condition is in the segment, the booster element may be placed there. Where there are multiple tiles of the match condition in the segment, a random choice may be made to select one of the tiles to place the booster element.

The processor may be further configured to generate a number of booster game elements, wherein the number of booster game elements which are generated is based on the number of game elements in a qualifying match condition supported by tiles of an activated segment. In such an embodiment, the computer device may be configured to access a variable associated with a game level of the game, the variable defining an upper limit on the number of booster game elements generated for each qualifying match condition.

As mentioned, in some embodiments, a particular activation component may be selected from multiple different activation components. This is described later in connection with FIG. 9. Each different activation component may configure the game logic differently. There may be a data structure stored in memory which comprises activation component data. The activation component data may be accessible to the processor to modify the game rules of a level based on the selected activation component. FIG. 5 shows two databases, T1 and T2, which may be accessed by a processor to implement the activation component functionality in-game.

Database T1 comprises exemplary activation component data. Each activation component may be associated with attributes or data such as a particular booster type, a grade, and grade progress data. A grade associated with a particular activation component may indicate the standard of in-game help that the particular activation component can provide to a user. For example, a higher grade may indicate that the activation component provides a larger activated segment, or other improved functionality over a lower grade activation component. The booster type associated with a particular activation component determines what type of booster element is generated when a match is made within an activated segment associated with the particular activation component. The grade indicates which set of grade data in a plurality of sets of grade data is used in a level. The grade progress data indicates an amount of progress which must be made in-game for a next grade to be reached.

A particular activation component may be associated with a particular set of grade data. The grade data may be stored in a data structure, for example such as database T2.

Database T2 comprises exemplary grade data for activation component AC3 of database T1. Database T2 includes a predefined set of grade data corresponding to each grade. When a player selects component AC3 to be used in a selected level, the processor may access database T1 and recognise that component AC3 is at grade 1. The processor may then access the data in database T2 to extract the grade data associated with grade 1. A rules modification to the selected level is then made such that the activation component may be utilised within the level according to the rules defined in the set of grade data. It will be appreciated that, because some booster elements are more valuable than others, different constraints on booster generation in an activated segment are required for each different activation component. For this reason, an equivalent of database T2 may exist for each different activation component, each different activation component having different sets of grade data associated with each grade.

When a particular activation component is selected for a level, the player may earn progress points which contribute towards an upgrade to the selected activation component. As the player earns progress points, the grade progress data in database T1 may be updated. Each grade may be associated with a points threshold, which, when reached, may cause the grade associated with the activation component to be increased. An activation component upgrade causes the database T1 to be updated, such that the grade of the upgraded component increases by one, and such that the grade data corresponding to the new grade is retrieved by the processor when the upgraded activation component is selected for use in-game.

An activation component may have improved capacity to help a user in game upon receiving an upgrade. It will be appreciated that, since some booster types are more valuable to players, the points threshold associated with an upgrade may differ between activation components, and may differ between grades. For example, the grade data of an activation component associated with a more valuable booster type may include a higher grade threshold for grade 1 than the grade data of an activation component with a less valuable booster. An upgrade to an activation component associated with a more valuable booster type may therefore take longer than an upgrade to an activation component with a less valuable booster type. An activation component may be associated with a booster type selected from a bomb, line blaster, column blaster, colour bomb and fish.

FIG. 6 shows an exemplary tile data structure 1603 comprising tile data for a level of a game, which may be stored in memory and accessible to the processor. The tile data structure 1603 may provide data to a rendering engine 1600 such that the data can be used to render a game on a gameboard presented on a user interface 26. The tile data structure 1603 includes an entry for each tile on a gameboard, each tile being associated with a tile ID 1605. Each tile ID 1605 in the tile data structure may also be have an associated tile attribute 1607. The tile attribute 1607 associated with a particular tile ID 1605 may define the state of the corresponding tile on the gameboard. In the example of FIG. 6, the tile with tile ID 1605 "T20" is shows to have the tile attribute 1607 "Blue Candy." Each time a user makes a move in-game, the tile data structure 1603 may be updated in accordance with any game elements that have changed tile location, been removed from the gameboard, or have been generated under the refill mechanism.

The tile data structure 1603 may also include data pertaining to the tiles which form part of a segment. Each tile ID may be associated with a segment ID 1609 which identifies that tile as being in a particular segment. The segment may comprise one or more array of adjacent tiles. However, the segment may comprise a plurality of non-adjacent tiles. In the example of FIG. 6, the tile with tile ID 1605 "$T_{20}$" is shown to have segment ID 1609 "$Seg_1$". The processor may be configured in the activation mode to activate one or more further segment, each activated segment comprising a further subset of the tiles. In the example of FIG. 6, the tile with tile ID 1605 "$T_{23}$" is shown to have segment ID 1609 "$Seg_2$", indicating that tile $T_{23}$ is in a different segment to tile $T_{20}$. Note that where there are multiple segments on the game board, they may all be activated, or only one or some may be activated. This may be determined by the activation component.

The tile data structure 1603 also includes a move counter 1611 that may define the number of moves for which a tile in an activated segment remains in the activated segment. For example, when a segment is activated, a starting point may be recorded, and a predetermined number of moves may be updated in the tile data structure 1603 to define a counter 1611. The counter may be incremented for each user move thereafter. If a booster creation criterion is met within the predetermined number of moves, the booster is provided. Once the number of user moves reaches the pre-determined number, no further boosters are offered for that segment 1105. Alternatively, a time limit may be imposed on the activation of the segment. When the number of moves/time has expired, the segment is deactivated. The visual indication of the segment may be altered to show that it is being deactivated, for example if a visual indication of an activated segment is to show game elements and tiles covered in water, the water may be shown in a dynamic visualisation as evaporating. The visual indication furthers serves to indicate to a user that the number of moves (or available time) to gain boosters has expired.

Figure 9:
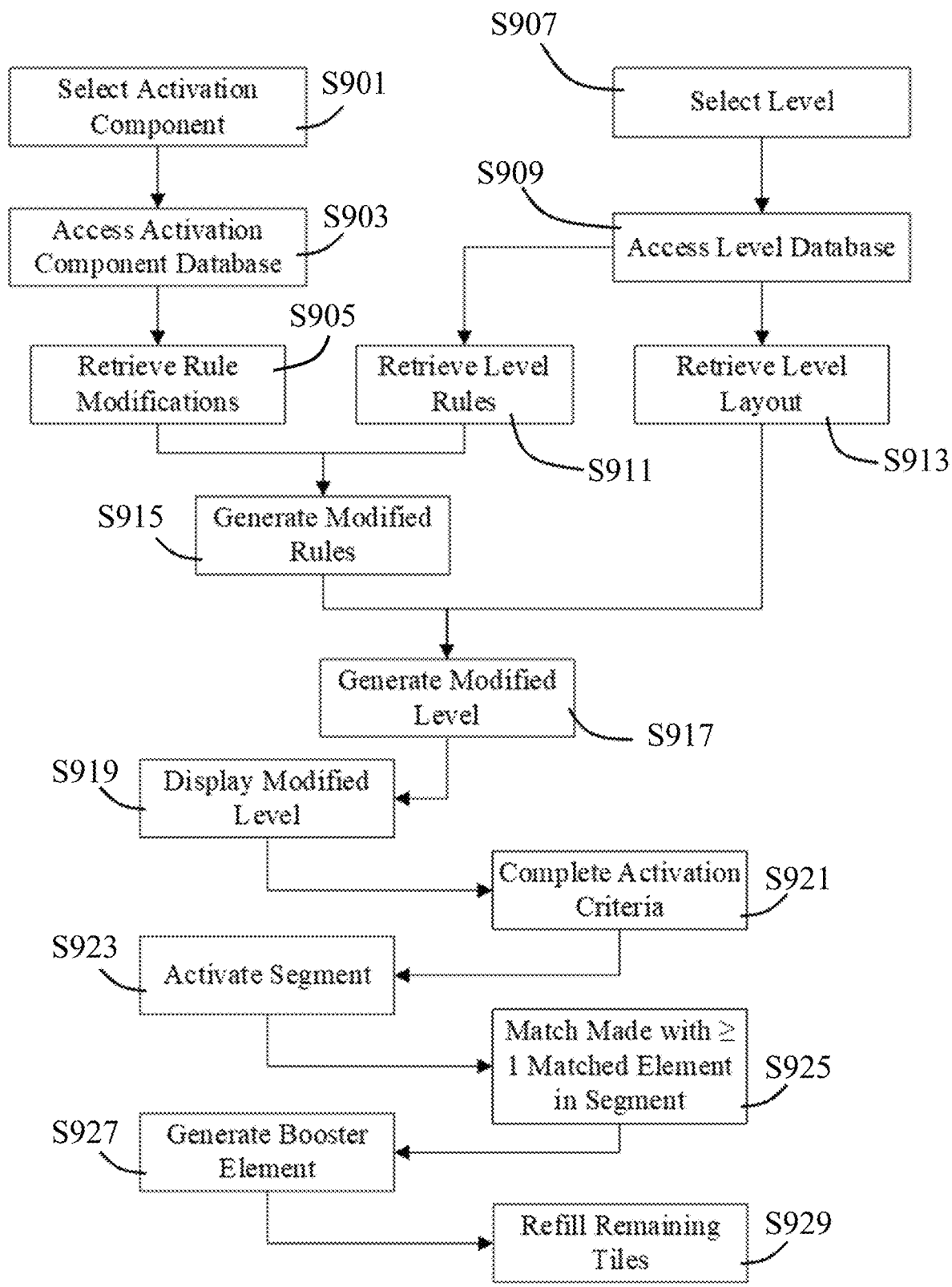
FIG. 9 is a flow chart that demonstrates a process for implementing an activation component feature.

FIG. 9 shows a flowchart which demonstrates the process of operating the processor to implement the game in accordance with an activation mode, wherein an activation component may be activated upon satisfaction of particular conditions. The processor may be configured to generate a pre-level screen on the user interface to enable a user to select from the pre-level screen an activation component from a plurality of activation components, each activation component associated with a corresponding activation mode. In such an embodiment, the booster game element which is generated may be of a type based on the activation component, in which case the processor may be configured to generate a booster game element selected from a line blaster, column blaster, colour bomb and fish.

At a step S901, a user may select a particular activation component via a user interface of a pre-level screen. In a step S903, the processor may access an activation component database and retrieve data pertaining to the selected activation component. For example, a particular activation component may be associated with a particular booster type, activation criteria, or segment size. In a step S905, the processor may retrieve rule modifications stored in memory pertaining to the activation mode and the selected activation component. In certain embodiments, this step is not implemented, for example in certain configurations the function of the activation component may be provided as an inherent part of a game level.

In a step S907, the user may select a particular level via a user interface of a pre-level screen. In response to the user selection of a particular level, the processor may access a level database stored in memory in a step S909 and access data pertaining to the selected level. The processor may access level rules data in a step S911, the level rules data including, for example, a level objective. The processor may also retrieve level layout data in a step S913, the level layout data including, for example, the initial game element type assigned to each tile ID and the number and orientation of tiles on the gameboard.

The processor may, in a step S915, generate modified level rules based on the rule modifications retrieved in step S905 and the level rules retrieved in step S911. The processor may then, in a step S917, combine the modified level rules with the level layout retrieved in step S913 to generate a modified level that acts in accordance with an activation mode. These steps are not needed in embodiments where the level data incorporates the function of the activation component.

In a step S919, the processor may then provide the modified level, or the selected level (with the activation component functionality already incorporated) to a rendering engine for rendering on a user interface of a display device.

Whilst playing the selected level, a user may satisfy activation criteria associated with the selected activation component in a step S921. In response to the satisfaction of the activation criteria, a segment comprising an array of one or more tiles may be rendered on the gameboard by the rendering engine, providing a visual indication of the activated segment to the user; this step is denoted S923. In a step S925, the user may create a qualifying match condition wherein at least one of the elements in the match is located within a tile that is part of the activated segment. In response to the user creation of a qualifying match condition within the segment, the processor may cause a booster element to be placed at a tile of the activated segment in a step S927. It will be appreciated that the booster may alternatively be placed at any tile of the gameboard. The booster element may be placed before or after refill of the gameboard. In some embodiments, the booster element is placed at a tile, and then moved to another tile in accordance with the refill physics. The flow ends at a step S929, whereby the remaining tiles are then refilled via the refill mechanism.

Figure 14:
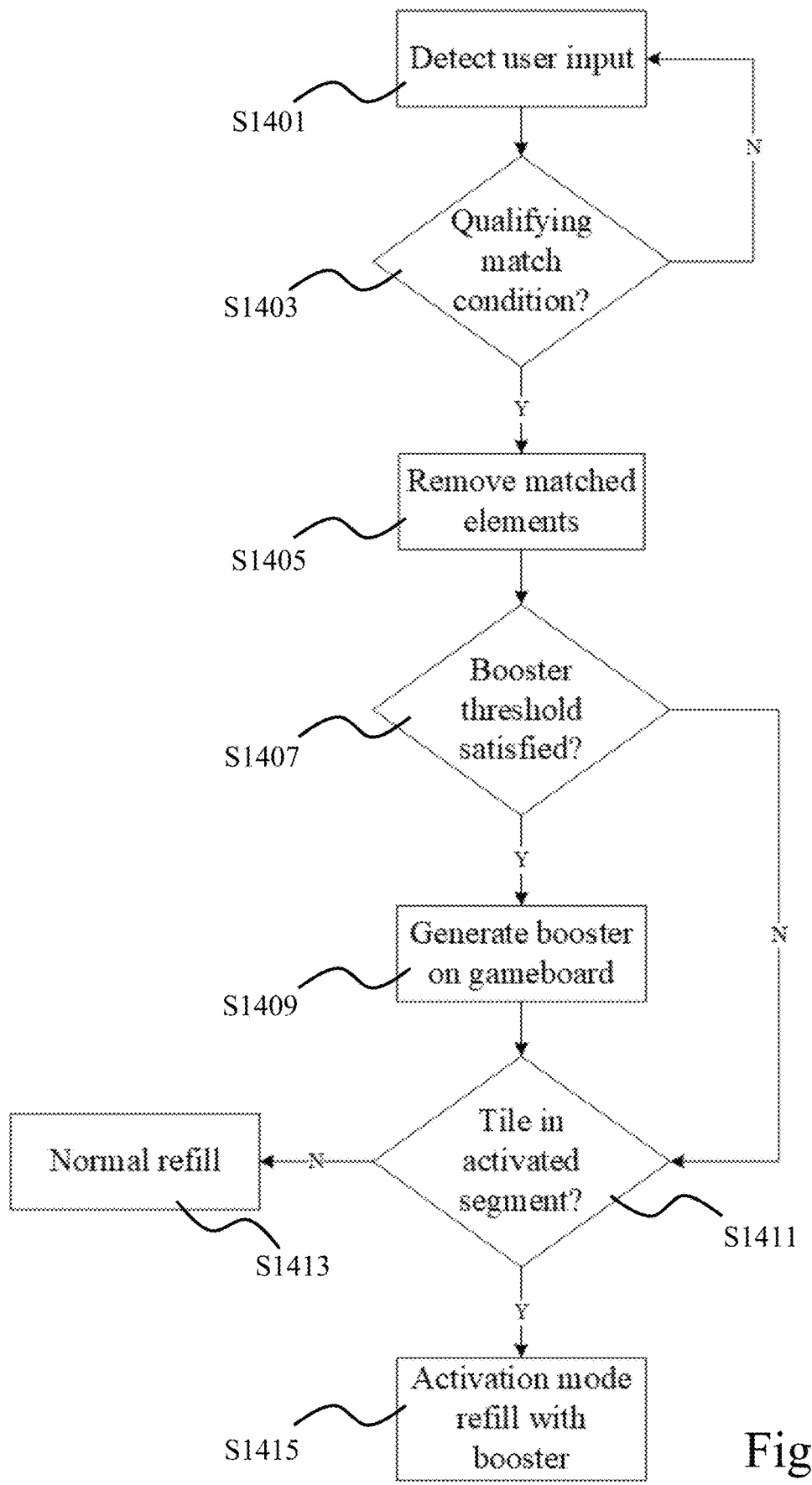
FIG. 14 is a flowchart that illustrates a method according to an embodiment of the invention.

FIG. 14 shows a flowchart that illustrates a method according to an embodiment of the invention. The flow begins at a step S1401, wherein the system detects a user input, the user input being a user move which swaps the tile positions of two adjacent game elements. Note in the following description that the process is not tied to any particular order of the steps. Certain steps may be ordered differently.

In response to the user input, the system may determine whether the user move satisfies a qualifying match condition, in a step S1403. If the user input does not satisfy a qualifying match condition, the system may reject the user move and await further user input at step S1401. If the user input does satisfy a qualifying match condition, the system may, in a step S1405, remove the game elements included in the match from the gameboard. In a step S1407, the system may determine whether the qualifying match condition also satisfies a booster threshold. If a booster threshold is satisfied, the system generates a booster game element on the gameboard in a step S1409. Following generation of a booster element on the gameboard at step S1409, the system determines whether at least one of the elements in the qualifying match condition was located within a tile included in an activated segment. This step is denoted S1411. Further, if no booster threshold is determined to be satisfied at step S1407, the system still determines whether at least one of the elements in the qualifying match condition was located within a tile included in the activated segment at step S1411.

If, following step S1411, the system determines that none of the elements in the qualifying match condition was located within an activated segment, a refill mechanism is used to refill the gameboard in a step S1413. Conversely, if at least one element in the qualifying match condition was located within an activated segment, the system generates, in a step S1415, a booster element or elements, the generated booster element corresponding to the selected activation component. The generated booster element is placed on the game board as previously described. In embodiments where there is more than one activated segment, a check is carried out to see if the match condition comprises tiles in any one of the activated segments.

Figure 11:
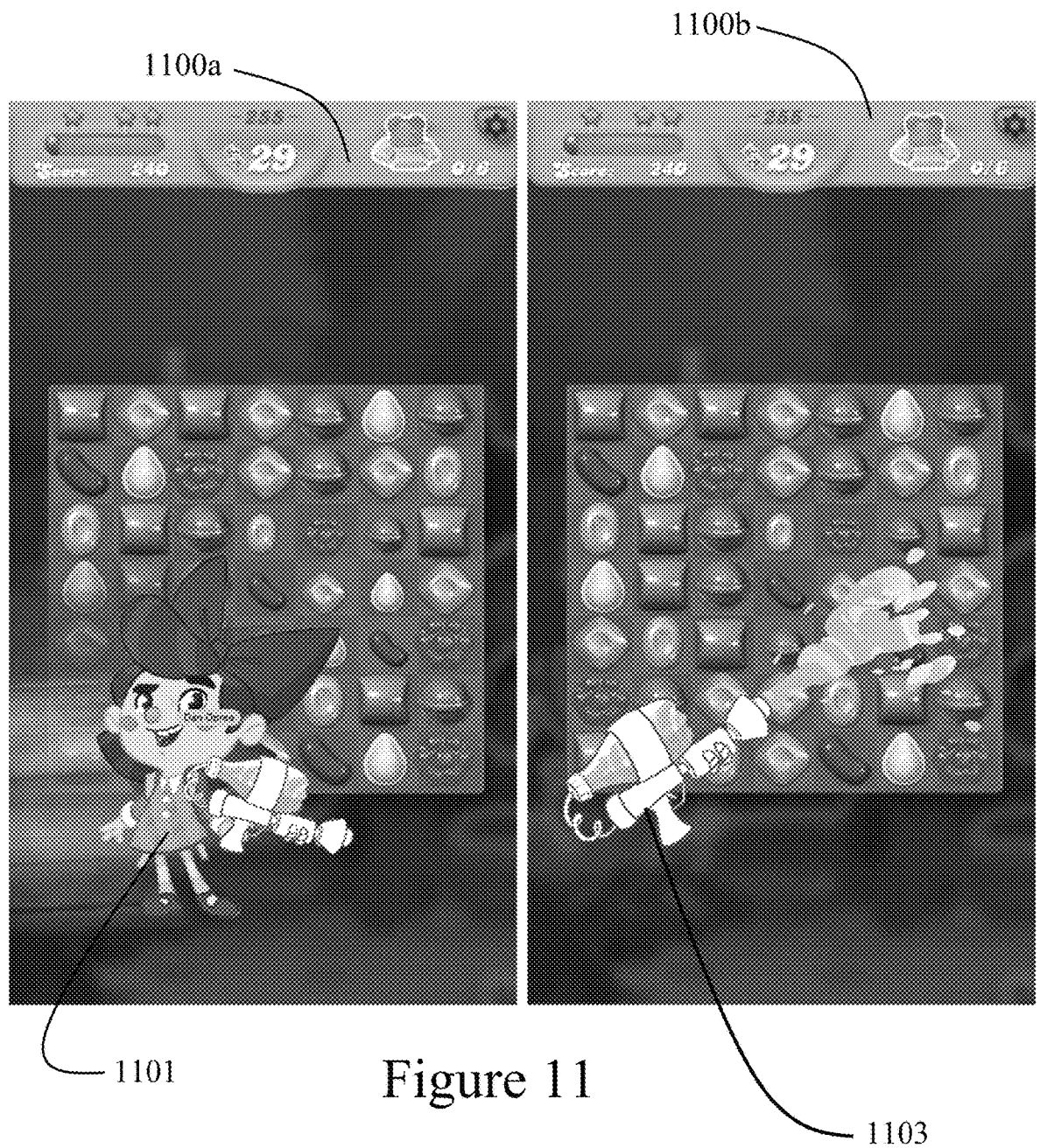
FIG. 11 shows an exemplary level of the Candy Crush game in which activation criteria have been met.

FIG. 11 shows two exemplary graphical user interfaces which present a level in the Candy Crush Soda Saga game, wherein an activation component has been selected to be a feature of the level. The activation component is rendered in the form of a graphical representation of a helper character (e.g. Power Kimmy) 1101. By playing the gameboard via the user interface 1100a, the user has satisfied one or more activation criteria associated with the selected activation component. In response to the user satisfying the criteria, an animation 1103 including a graphical representation 1101 of the selected activation component may be displayed. For example, in user interface 1100b, an animation is taking place wherein a graphical representation 1101 of the activation component is spraying a light-blue liquid over the surface of the game board.

Figure 12:
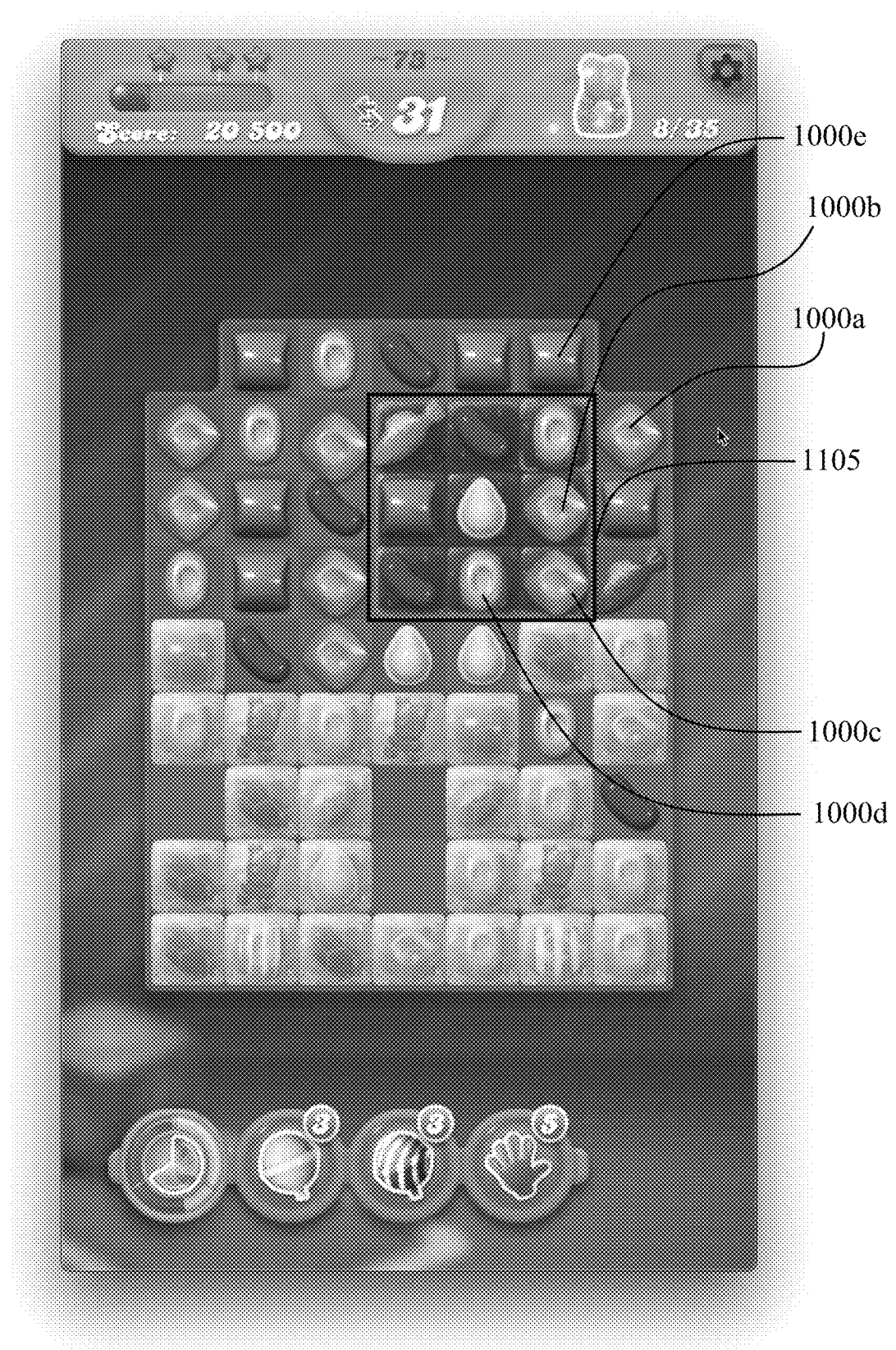
FIG. 12 shows an exemplary level of the Candy Crush game, in which a segment has been activated.

FIG. 12 shows a graphical user interface for the in-game scenario as in FIG. 11, wherein the exemplary animation of user interface 1100b has ended. Following the animation, a portion of the game board may be graphically modified to indicate to the user an in-game activation mode functionality associated with that portion of the game board. The graphically modified area may be considered an "activated segment" 1105 of the game board. FIG. 12 shows the game board including the graphically modified activated segment 1105, which is activated by satisfaction of the activation criteria associated with a selected activation component. In FIG. 12, the graphical modification is to show darkened background of the tiles of the activated segment. Many other graphical modifications are possible to indicate that there is one or more activated segment.

When a match, comprising three or more game elements of the same type (such as colour), is made within the activated segment 1105, one or more booster of the type associated with the activation component is created in place of one or more of the matched game elements in the activated segment 1105. The activated segment 1105 may therefore present further opportunities for tactical gameplay to the user, as an additional factor which may be considered when a user devises a strategy. It will be appreciated that in some embodiments, the processor may be configured to randomly determine at least one of a size of the activated segment 1105, shape of the activated segment 1105 and placement of the activated segment 1105 on the gameboard. Alternatively, at least one of the shape of the activated segment 1105, size of the activated segment 1105 and placement of the activated segment 1103 on the gameboard may be predefined.

It will be appreciated that in some embodiments, not all of the game elements that form part of a colour match need to be located within the activated segment 1105 of the game board for a booster to be created. For example, a 3-element match, wherein just one of the matched elements is located within the activated segment 1105 may still provide a booster, the booster being created in place of the one element that was within the activated segment 1105. The processor may be configured to generate one or more further booster game elements when a qualifying match condition is detected based on activation data associated with the activation component. FIG. 12 shows three game elements 1000a, 1000b, 1000c which are of the same type (i.e they share a common characteristic). Two of the game elements 1000b, 1000c are in the activated segment 1105. When the uppermost game element 1000a is moved to the left, a 3-element match is made involving the game elements 1000b, 1000c in the activated segment. A further game element 1000d is illustrated, which will be replaced by a booster element as described later.

Further, it is possible that a player makes a match that would create a booster in existing systems (such as a 5-in-a-row) within the activated segment. In such a case, a booster element corresponding to the match may be created in addition to the booster elements created as a result of the match occurring in the activated segment 1105. That is, the processor may detect if the number of adjacent user selectable game elements in the qualifying match condition satisfies a threshold for a booster creation condition, and to generate a booster game element when the threshold for the booster creation condition is satisfied, the booster game element being provided on the gameboard. This may occur even if the match is made within an activated segment.

Figure 13:
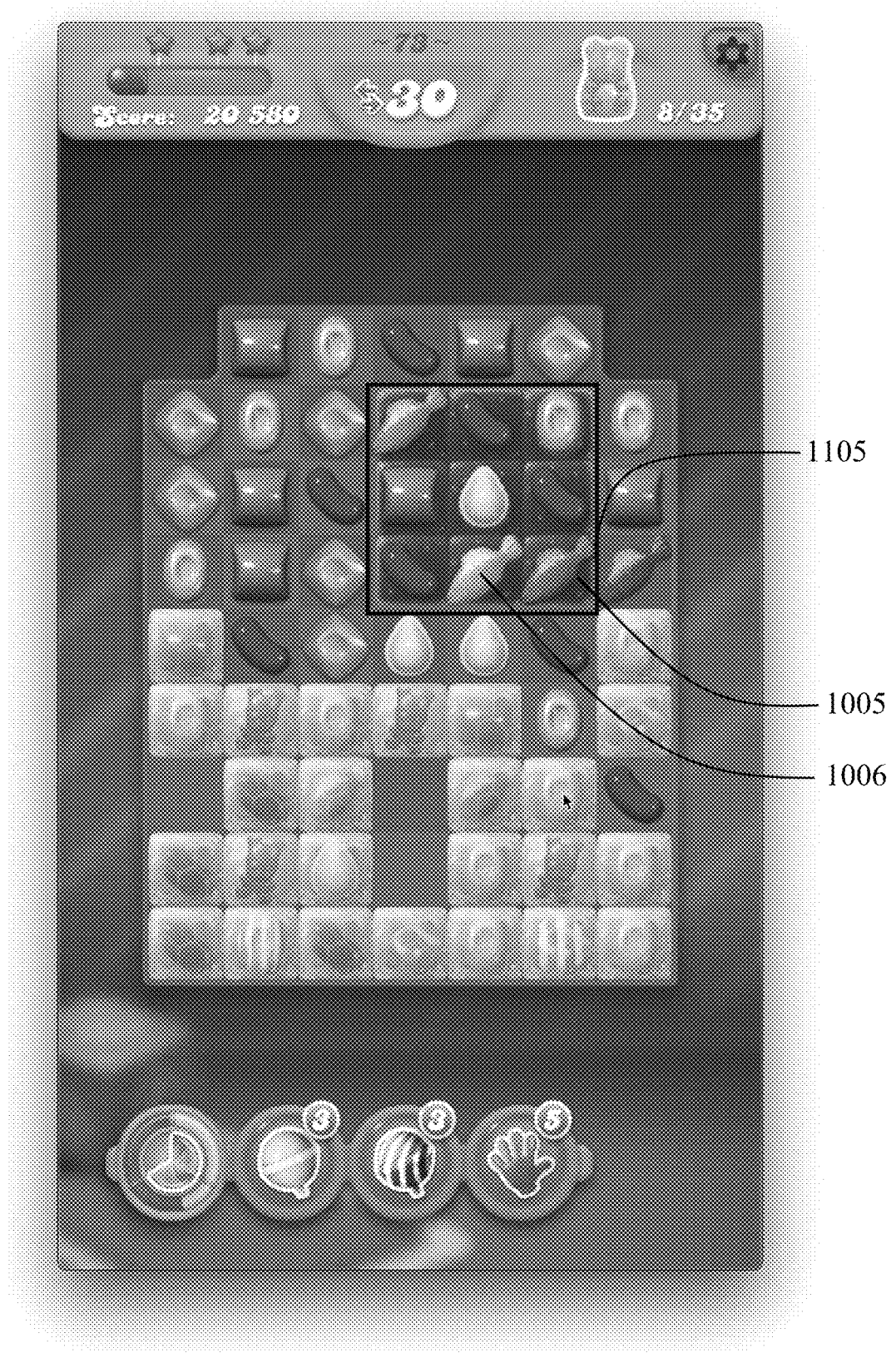
FIG. 13 shows an exemplary level of the candy crush game, in which a booster element has been generated within an activated segment.

FIG. 13 shows the exemplary graphical user interface of FIG. 12 in which the 3-element match has been made, wherein two of the matched elements was located within the activated area of the game board. As a result, two booster elements 1005, 1006, in this example fish boosters, have been created in the activated segment 1105.

A first one of the booster elements 1005 is shown in the lower right hand corner of the activated segment. This booster element replaced a game element 1000e (shown in FIG. 12) which moved down into the vacated tiles as a result of the refill physics during a refill process to replenish the gameboard after the matched game elements 1000a, 1000b, 1000c were removed. A second one of the booster elements 1006 is shown in the middle of the lower row of the activated segment. This booster element replaced the game element 1000d (even though the game element 1000d was not removed as part of a match condition). In some embodiments, as illustrated in FIGS. 12 and 13, the booster element inherits the characteristics of the game element that it replaces. for example, the booster element 1006 is an orange fish, because the game element 1000d was an orange candy.

Although not shown in the figures, the generation and placement of a booster element as a result of a match which involved at least one game element in the activated segment may be associated with a visual effect, such as a halo around each booster element. In some embodiments, the effect is temporary.

As previously described, when a colour match causes matched game elements to disappear, the game elements immediately above those that disappeared fall to replace the matched elements. The game board is then repopulated with a corresponding number of new game elements. If the falling elements happen to fall into an orientation in which a further colour match occurs, those elements also disappear and are replaced by those immediately above; this is the cascading effect. In some embodiments, a colour match within the activated segment 1105 which is caused by a cascading effect may cause a booster element 1005, 1006 to be created. In other embodiments, a colour match within the activated segment 1105 which is caused by a cascading effect may not cause a booster element to be created.

The activated segment 1105, once activated, may provide the booster creation functionality for a pre-determined number of user moves. That is, a starting point is recorded when the segment 1105 is activated, and a counter 1611 is incremented for each user move thereafter. If a booster creation criterion is met within the predetermined number, the booster is provided. Once the number of user moves reaches the pre-determined number, no further boosters are offered for that segment 1105.

In other embodiments, the activated segment 1105 may provide the booster creation functionality for a pre-determined amount of time. That is, a starting time is recorded when the segment 1105 is activated, and the predetermined amount of time is added to the starting time to define an end time. If a booster creation criterion is met before the end time is reached, the booster is provided. Once the end time has been reached, or the predetermined amount of time has elapsed, no further boosters are offered for that segment 1105. That is, the processor may be configured to restrict the availability of the generated booster game elements for user play based on a time limit or a limit of user moves.

In some embodiments, the activated segment 1105 may not be a visible feature of the game board. For example, the area may be implemented as an invisible 'power-up' mode. In such cases, the effect of the activated segment 1105 may be the same as if the activated segment 1105 were visible, but the user may be unaware of the instance or location of the activated segment 1105.

Figure 4:
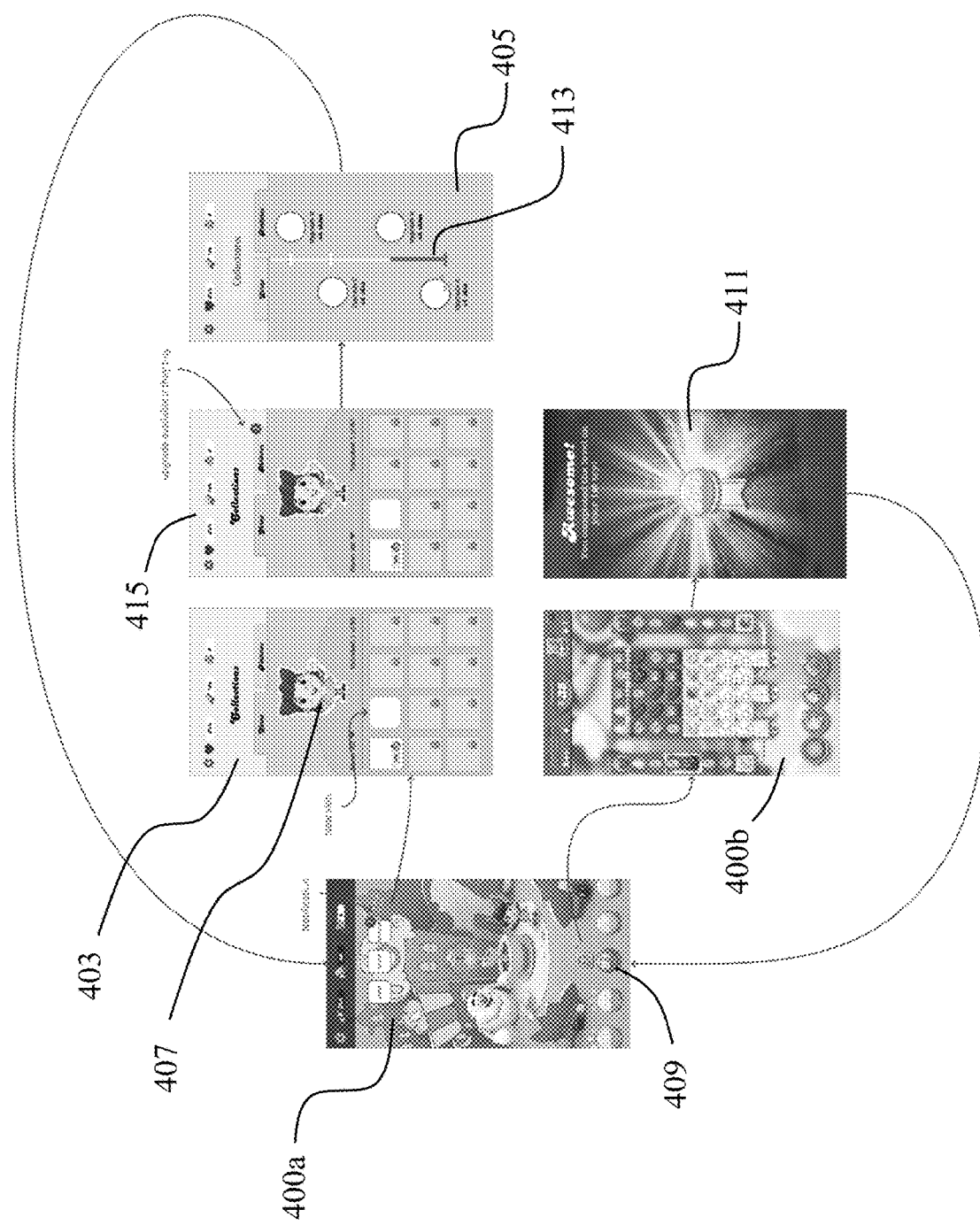
FIG. 4 shows a series of user interfaces in the Candy Crush game.

FIG. 4 shows a series of user interfaces in the game Candy Crush, and also indicates how the interfaces can be navigated between by the user. User interface 400a shows an example of a Saga Map presented to the user on the display of a user device 240. On the Saga Map, the user is presented with a series of levels, each level having a level icon 409. For a level to become available to a user, the previous level must be completed first. Selection of a level icon 409 may cause the level associated with that level icon to be loaded if the associated level is available to the user. For example, in FIG. 4, the user may be presented with a switcher game level, such as in user interface 400b, upon selection of a level icon 409 associated with an available level. After completing the level, the user may be presented with a level completion screen 411 before being returned to the saga map user interface 400a. In the example of user interface 400a, each completed level is shown to have a gold level icon 417 and a "star rating," the star rating being a visual indicator of the standard to which the user completed the level. That is, a quantity of stars, up to a maximum of three, may be displayed with the gold level icon 417 of a completed level based on, for example, the number of points the user earned when completing that level. A completed level icon 417 may still be selectable after completion. For example, a user who achieved one or two stars on a particular completed level may load that level again and attempt to achieve three stars.

An available incomplete level in user interface 400a is represented by a level icon 409 labelled "31". The level icons corresponding to levels that follow level 31, the current level, may have a different graphical representation to the completed or current level(s). For example, the level icon 419 corresponding to level "32" is has a different graphical representation compared to the current level icon 409 and the completed level icon 417. Note that levels that follow the current level, in this example level 31, may not be available to be played until the user has completed level 31.

The Saga Map user interface 400a also includes graphical representations of activation components 407. The user interface 400a may also include selectable features which, when selected, present the user with a pre-level screen 403 in which the user may select a particular activation component 407 for use in a selected level, and customise the in-game abilities and/or appearance of the activation component 407. Selection of a particular activation component 407 may cause rule modifications which modify the "normal" rules associated with the selected level, the "normal" rules being the rules that would otherwise govern the level if no selection of an activation component 407 were made.

FIG. 4 also shows a second version of the pre-level screen 403, wherein the selected activation component is shown to have an available upgrade; this screen is denoted 415. Selection of the abilities tab in screen 415 may present the user with a progress screen 405, wherein user can see a visual representation of their progress towards the next activation component upgrade.

The computer device configured to implement the activated segment functionality is configured to implement it in a game with a switcher mechanic. The ideas explained may also be implemented for games with other mechanics. Features of one example of a switcher mechanic is laid out below.

Match 3 Switcher Game

The above described computer device is configured to interact with a user to implement the activation mode in a game, which in some embodiments can be a match-3 switcher game. The following description describes additional game components of match 3 switcher games. The person skilled in the art will understand that there are many other ways the present ideas can be implemented, and the description is not limited to only one implementation. The following features can be used in combination with any of the aforesaid novel device features or game components.

Glossary/Terms

Game board: The area where the matching and swapping of elements occur: Note that the entire game board is not visible to a player but can be scrolled to change the player view.

Game elements: All elements that appear on the game board.

Standard game elements: These are the six basic candies used for making switches and colour matches on the game board. Compared to special game elements, the standard game elements have no extra properties or behaviour, they are only used to make colour combinations or to create new special game elements.

Ingredients: Game elements that are included in levels where one of the goals to complete the level is to bring down ingredient elements to the bottom of the game board.

Jelly block: A game element that is placed underneath other game elements and need one or two matches on top of them to disappear.

Special game elements: All elements that appear on the game board and which have specific behaviours and properties.

Striped candy: A special candy with a line blast effect which means it removes one row or one column.

Line blast: An effect which removes one row or one column.

Moves & Score Level: In this game mode you have a limited number of switches before running out of moves. If you have not reached the score required to earn at least 1 Star, then you will fail the level.

Jelly Level: In this game mode the game board behind the candy is covered in jelly. Remove the jelly by matching candy on top of the jelly. If you fail to remove all jelly before running out of moves then you will fail the level.

Ingredients Level: In this game mode, ingredients will appear on the game board. Collect these ingredients by bringing them to their delivery point. On the side of the board you will see a recipe of how many ingredients you need to collect. If you do not bring down all the ingredients before running out of moves then you will fail the level.

Time Limited Level: In this game mode there is a time limit. If you have not reached the score required to earn at least 1 Star when the time runs out, then you will fail the level.

Candy Order level: In this game mode, you are tasked with collecting a number of candies. This is done by removing the wanted candies. If you have not collected all the wanted candies before running out of moves, then you will fail the level.

Bomb element: a candy in wrapped paper which removes candies in a 3×3 square area.

Wrapped candy: a candy in wrapped paper which removes candies in a 3×3 square area.

Colour Bomb: Removes all candies of the colour it is being swapped with.

Booster: Something that enhances the gameplay and that supports, assists, or increases power or effectiveness.

Blocker: Blocking game elements that are unswappable, need 1 or more matches next to them to disappear or may be removed by triggered special game elements and are in the way for falling candies.

Candy Crush Saga™ by the games developer King™ is a game belonging to the match-3 category of games. The game has more than 350 different levels and not all of those levels have the same requirements to be completed. Simply matching three or more game elements is not enough to complete all levels in the game but the player has to meet certain goals as well. These goals could be to reach a certain amount of points before running out of moves or time; to bring down certain game elements to the bottom of the screen; to remove a certain amount of game elements before running out of moves or to collect certain game elements through specific matches before running out of moves.

If the game becomes difficult there are boosters to help the player pass a level. These can be obtained from in-game purchases or received as gifts from friends connected through a social network. The game may also include activation components such as those described herein to allow a user to more easily receive boosters in-game.

The game also has a candy land themed map view. The map view shows what levels have been completed as well as how many levels are left to play. Throughout the game and for each level completed, the player journeys across the map and follows the story of a girl who is journeying through the candy land. The map is also divided into different areas where each area has its own candy theme as well as a small story connected to that area.

Rules

In some implementations additional moves can be earned by good gameplay.

The game board may be a scrolling game board. The display displays a grid of square tiles, each with a game element, showing the whole or a portion of the level being played.

Different Goals to Complete Levels

To add more diversity and make Candy Crush Saga™ a more dynamic game, players have to fulfil different criteria in order to complete different levels; these are referred to as goals. Each level always has one or more goals that have to be fulfilled in order to complete that level.

Reach a Set Score before Running Out of Moves

One of Candy Crush Saga's most common goals is to collect a certain amount of points before running out of moves. The points are collected through making matching combinations on the game board. The smarter combinations made, the more points. Points collected in-game may also contribute to other features of the game, such as activating a segment associated with an activation component.

Reach a Set Score before Running Out of Time

Candy Crush Saga also has timed levels. The goal that needs to be fulfilled on these levels is to collect a certain amount of points before time runs out. The smarter combinations made, the more points.

Bring Down Ingredients

Some levels are referred to as Ingredients levels. The Ingredients levels have two goals which need to be fulfilled in order to complete the level:
  The player has to reach a certain target score before running out of moves.
  The player has to bring down a certain number of so-called ingredients to the bottom of the game board before running out of moves. When the ingredients reach the bottom of the game board they disappear and candies above them take their place. Ingredients are game elements shaped as fruits or nuts and only exist for this specific goal. They are not matchable with other game elements, but they can be switched with other game elements.

Clear Jelly

One of the most frequent set of goals in Candy Crush Saga is the one used for levels that contain Jelly blocks. Jelly blocks are game elements that are found underneath other game elements and need one or two matches on top of them to disappear (See description elsewhere). The goals that need to be fulfilled on levels with Jelly blocks are:
- Reach target score before running out of moves (as described elsewhere)
- Remove all jelly blocks before running out of moves

Collect Certain Elements

Another type of level Candy Crush Saga has introduced to their variety of game modes is a so-called Order level. Order levels have two goals:
- Reach target score before running out of moves (as described elsewhere).
- Collect certain amount of candies through specific matches as well as achieving hard to make combos specified on the level played.

Balance Mode

In this game mode, players are required to collect an even amount of two colours of candies to complete the level. The level goal can be indicated with a scale where the two different types of candies to be collected are placed on either side. When the count is unbalanced, one side of a scale starts tipping, the bigger the difference the faster it tips. If one end touches bottom level has failed. Score is given to the player based on the number of moves it takes to collect the required amount of the two colours.

Crescendo Mode

The goal of this game mode is to light up all squares/cells on the game board. In some implementations, the requirement to light up a cell is to combine a candy that is in that cell. In other implementations, the player has to combine multiple candies in the same cell before it lights up.

Digging Mode

In this game mode, players are required to combine candies in cells adjacent to blockers in order to 'dig' down in the level. When digging, the player can uncover objects that are covered initially.

Multiple Game Modes

All of the game modes described herein can also be used in any combination with one another. For instance, the requirement to complete one level could be to remove all jelly as well as bringing down ingredients.

Basic Rules

How to Play

If the player tries to make a move with two candies in such a way that no candy will be matched with at least two more of its own colour, then the move will not be allowed and the player will have to try to find another move.

If no moves are possible on the game board then all the candies are reshuffled so that there will always be at least one possible move available. If the player can't see or find a move to make, then the game helps the player by giving a hint. The hint is displayed after a few seconds of inactivity and is shown by brightening and magnifying the candies of a possible move in a flashing animation.

Advanced Rule

Not only the match of 3 candies is allowed but matches of more candies can also be done; Matches with more than 3 candies give more points and is something the player should try and aim for. Different acceptable matches are:
- Match of 3 in a line.
- Match of four in a vertical line.
- Match of four in a horizontal line.
- Match of four in a 2×2 square.
- Match of five in a vertical line.
- Match of five in a horizontal line.
- Match of five in a T-shape.
- Match of five in an L-shape.
- Match of 6 or more candies in a combination of 4-in-a-row, 5-in-a-row, T- and L-shapes.

As can be noticed from the list of possible matches, no diagonal matches are accepted. Diagonal matches and/or swaps can be allowed in some implementations of the game.

Combos to Receive Special Elements

Matches made of four or more candies not only give more points but also reward the player with special game elements. The special game elements received from combos have various positive properties and can be used to gain more points and to easier pass a level. The elements received from different matches are:
- 4-in-a-row: Striped candy—striped candies remove a whole row or column (including any blockers) if matched with two or more candies of the same type.
- 4 in a 2×2 block: Fish—Fish are triggered in a match condition. When triggered, they "swim" to a random candy and remove it.
- L- or T-shape: Wrapped candy—when triggered in a match, wrapped candies trigger two extensions in a cascade, removing candies in a 3×3 square around the wrapped candy.
- 5-in-a-row: Colour bomb—colour bombs are triggered if swapped with any candy—no match-3 is necessary. When a colour bomb is triggered it removes all candies of the same colour as the candy that was used to trigger it.

If a match is made with more than 6 candies, then it is likely that the combo is a shape merged from 4-in-a-row, 5-in-a-row, L-shape and T-shape. If so, there is a hierarchy of what kind of special element is received:
- If there is a merge of 4-in-a-row and an L- or T-shape, then the special game element received will be the same as from an L- or T-shape. L- and T-shapes give the same special game element.
- If there is a merge of 5-in-a-row and an L- or T-shape, then the special game element received will be the same as from a 5-in-a-row combo.

Note that special elements may be received without creating the above combos if the activation component functionality is in use and a segment has been activated. In such a case, a special element may be provided on the game board depending on the type of activation component that is being used. The above-described combos may not need to be made in order for a user to receive a particular special element.

How to Trigger Special Elements

To use the special game elements received from combos there are two different ways:
- Some of the special game elements are triggered through a standard match with two or more candies of the same colour as the special game element.
- Some of the special game elements are triggered by swapping place with any candy regardless if a match-3 is made.
- Some of the special game elements are triggered by making a match of 3 or more elements within an activated segment, wherein the type of special element received depends on the type of activation component selected.

Combining Special Elements with Each Other

Special game elements received from matches, or through an activated segment associated with an activation component, can be combined with each other for various positive effects affecting the game board. Striped candies, Wrapped candies and Colour bombs can all be matched with each other. To trigger these combos, they do not need to be matched by game elements of the same colour but can simply be swapped with each other for an instant trigger.

Points

The points given for different combinations and removals of blocks are:
- 3-in-a-row: 60 points
- 4-in-a-row: 120 points
- 5-in-a-row: 200 points
- T-shape: 200 points
- L-shape: 200 points
- Break a Jelly block: 1000 points
- Break a Frosting block: 20 points/per block
- Break a Chocolate block: 20 points/per block
- Get an ingredient to the bottom of the screen: 10 000 points
- Using a special game element to remove other game elements: 60 points/per element removed Game Elements Standard Game Elements In Candy Crush Saga there are 6 standard game elements which all look like candies:
- Purple candy in the shape of a flower
- Blue candy in the shape of a sphere
- Green candy in the shape of a square block
- Red candy in the shape of a tilted bean
- Yellow candy in the shape of a drop
- Orange candy in the shape of an oval Special Game Elements Special game elements can either be received from special combos or from an automatic placement on the game board. It will be appreciated that, whilst specific embodiments of the invention have been described, these are not exhaustive. The scope of the invention is not defined by the described embodiment but only by the appendant claims.

The invention claimed is:

1. A computer device configured to provide a game to a user, the computer device having:
   a user interface comprising a display and configured to provide on the display a gameboard comprising tiles supporting game objects, wherein at least some of the tiles support game objects which are user selectable game elements of differing characteristics, the user interface configured to detect user input when a user engages with a user selectable game element; and
   a processor configured to receive a detected user input with one of the user selectable game elements and detect a qualifying match game condition of a plurality of adjacent user selectable game elements having matching characteristics, and
   configured to remove the plurality of user selectable game elements of the qualifying match game condition when a qualifying match game condition is detected and to generate new user selectable game elements to replenish the gameboard;
   wherein the processor is further configured to act in an activation mode to selectively activate a segment of the gameboard, the segment comprising a subset of the tiles, wherein the processor is configured to determine on detection of a qualifying match game condition if any of the tiles supporting the user selectable game elements of the qualifying match condition belong to the activated segment, and, if so to generate a booster game element for any qualifying match condition in which at least one of the user selectable game elements is supported by a tile of the segment.

2. The computer device of claim 1 wherein the processor is further configured to detect if the number of adjacent user selectable game elements in the qualifying match condition satisfies a threshold for a booster creation condition, and to generate a booster game element when the threshold for the booster creation condition is satisfied, the booster game element being provided on the gameboard.

3. The computer device of claim 1 wherein the processor is configured to visually indicate the segment to a user.

4. The computer device of claim 1 wherein the processor is configured to randomly determine at least one of a size of the segment, shape of the segment and placement of the segment on the gameboard.

5. The computer device of claim 1 wherein at least one of the shape of the segment, size of the segment and placement of the segment on the gameboard is predefined.

6. The computer device of claim 1 wherein the processor is configured to generate a graphical rendering of an activation component to visually indicate activation of the segment in the activation mode.

7. The computer device of claim 6 in which the processor is configured to graphically render the activation component as a character.

8. The computer device of claim 1 configured to provide a clicker game in which the qualifying match condition comprises two or more matching game elements.

9. The computer device of claim 1 configured to provide a game selected from a switcher and linker in which the qualifying match condition comprises three or more matching game elements.

10. The computer device of claim 1 in which the booster game element which is generated is of a type selected from a bomb, line blaster, column blaster, colour bomb and fish.

11. The computer device of claim 1 wherein the processor is configured to generate a pre-level screen on the user interface to enable a user to select from the pre-level screen an activation component from a plurality of activation components, each activation component associated with a corresponding activation mode.

12. The computer device of claim 11 in which the booster game element which is generated is of a type based on the activation component.

13. The computer device of claim 12 wherein the processor is configured to generate a booster game element selected from a line blaster, column blaster, colour bomb and fish.

14. The computer device of claim 1 wherein the processor is configured to generate a number of booster game elements, wherein the number of booster game elements which are generated is based on the number of game elements in the qualifying match condition supported by tiles of the activated segment.

15. The computer device of claim 14 which is configured to access a variable associated with a game level of the game, the variable defining an upper limit on the number of booster game elements generated for each qualifying match condition.

16. The computer device of claim 1 wherein the processor is configured to generate the booster game element on a randomly selected tile of the activated segment.

17. The computer device of claim 1 wherein the processor is configured to generate the booster game element on a randomly selected tile of the gameboard.

18. The computer device of claim 1 wherein the processor is configured to act in the activation mode to activate the segment in response to determination that the user has satisfied certain predefined criteria based on the detected user input.

19. The computer device of claim 1 wherein the processor is configured to act in the activation mode to activate the segment in response to determination that the user has satisfied certain predefined criteria based on the detected user input wherein the predefined criteria depend on the selected activation component.

20. The computer device of claim 1 wherein the processor is configured to restrict the availability of the generated booster game element for user play based on a time limit or a limit of user moves.

21. The computer device of claim 1 wherein the segment comprises one or more array of adjacent tiles.

22. The computer device of claim 1 wherein the segment comprises a plurality of non-adjacent tiles.

23. The computer device of claim 1 wherein the activation mode is associated with an activation component, and where the number of tiles in the activated segment is based on activation data associated with the activation component.

24. The computer device of claim 1 wherein the activation mode is associated with an activation component, and wherein the processor is configured to generate one or more further booster game elements when a qualifying match condition is detected based on activation data associated with the activation component.

25. The computer device of claim 1 wherein the processor is configured in the activation mode to activate one or more further segment, each activated segment comprising a further subset of the tiles.

26. A method of providing a game to a user on a computer device, the method comprising:
   providing on a display of a user interface of the computer device a gameboard comprising tiles supporting game objects, wherein at least some of the tiles support game objects which are user selectable game elements of differing characteristics,
   receiving a detected user input when a user engages with one of the user selectable game elements;
   responsive to the detected user input, detecting a qualifying match game condition of a plurality of adjacent user selectable game elements having matching characteristics; removing the plurality of user selectable game elements of the qualifying match game condition when a qualifying match game condition is detected and generating new user selectable game elements to replenish the gameboard;
   the method further comprising, in an activation mode, selectively activating a segment of the gameboard, the segment comprising a subset of the tiles, and determining on detection of a qualifying match game condition if any of the tiles supporting the user selectable game elements of the qualifying match condition belong to the activated segment, and, if so generating and providing on the gameboard a booster game element for any qualifying match condition in which at least one of the user selectable game elements is supported by a tile of the segment.

27. Non-transitory computer readable media on which are stored computer readable instructions which when executed by a processor of a computer device cause the processor to implement a method providing a game to a user on the computer device, the method comprising:
   providing on a display of a user interface of the computer device a gameboard comprising tiles supporting game objects, wherein at least some of the tiles support game objects which are user selectable game elements of differing characteristics,
   receiving a detected user input when a user engages with one of the user selectable game elements;
   responsive to the detected user input, detecting a qualifying match game condition of a plurality of adjacent user selectable game elements having matching characteristics; removing the plurality of user selectable game elements of the qualifying match game condition when a qualifying match game condition is detected and generating new user selectable game elements to replenish the gameboard;
   the method further comprising, in an activation mode, selectively activating a segment of the gameboard, the segment comprising a subset of the tiles, and determining on detection of a qualifying match game condition if any of the tiles supporting the user selectable game elements of the qualifying match condition belong to the activated segment, and, if so generating and providing on the gameboard a booster game element for any qualifying match condition in which at least one of the user selectable game elements is supported by a tile of the segment.

* * * * *